US012330162B2

(12) United States Patent
Cote et al.

(10) Patent No.: US 12,330,162 B2
(45) Date of Patent: Jun. 17, 2025

(54) SEGMENTED PIPETTE TIP ADAPTER

(71) Applicant: Avidien Technologies, Inc., Hudson, MA (US)

(72) Inventors: Richard Cote, Hudson, MA (US); Brian Gallagher, Natick, MA (US)

(73) Assignee: Avidien Technologies, Inc., Hudson, MA (US)

( * ) Notice: Subject to any disclaimer, the term of this patent is extended or adjusted under 35 U.S.C. 154(b) by 904 days.

(21) Appl. No.: 17/442,325

(22) PCT Filed: Mar. 25, 2020

(86) PCT No.: PCT/US2020/024696
§ 371 (c)(1),
(2) Date: Sep. 23, 2021

(87) PCT Pub. No.: WO2020/198347
PCT Pub. Date: Oct. 1, 2020

(65) Prior Publication Data

US 2022/0152616 A1 May 19, 2022

Related U.S. Application Data

(60) Provisional application No. 62/824,660, filed on Mar. 27, 2019.

(51) Int. Cl.
*B01L 9/00* (2006.01)
*B01L 3/02* (2006.01)

(52) U.S. Cl.
CPC ............. *B01L 9/543* (2013.01); *B01L 3/0275* (2013.01); *B01L 2200/023* (2013.01); *B01L 2200/026* (2013.01)

(58) Field of Classification Search
CPC .. B01L 9/543; B01L 9/0275; B01L 2200/023; B01L 2200/026; B01L 3/563
(Continued)

(56) References Cited

U.S. PATENT DOCUMENTS 3,327,535 A 6/1967 Littlejohns
3,683,977 A 8/1972 Crowe et al.
(Continued)

FOREIGN PATENT DOCUMENTS

WO 2011/007194 A1 1/2011
WO 2013/012588 A1 1/2013
(Continued)

OTHER PUBLICATIONS

Ex Parte Quayle Action in U.S. Appl. No. 29/685,275, filed Mar. 27, 2019, 10 pages.
(Continued)

*Primary Examiner* — Maureen Wallenhorst
(74) *Attorney, Agent, or Firm* — Gregory P. Einhorn; Bruce Grant; Greer, Burns & Crain, Ltd.

(57) ABSTRACT

The technology relates in part to a segmented pipette tip adapter that includes a plurality of plate segments and a junction between adjacent plate segments. Each of the plate segments often includes a proximal surface, a distal surface, edges, one or more nozzles disposed on the proximal surface, and one or more tubular projections disposed on the distal surface. Each of the nozzles often includes a nozzle bore, each of the tubular projections often includes a tubular projection bore, each of the plate segments often includes a plate bore disposed at each of the nozzles, and each nozzle bore often is aligned with a tubular projection bore and a plate bore. Each junction often is between adjacent edges of a pair of adjacent plate segments.

16 Claims, 26 Drawing Sheets

(58) Field of Classification Search
USPC .................. 422/521, 524, 525, 526; 436/180
See application file for complete search history.

(56) References Cited

U.S. PATENT DOCUMENTS

| | | | |
|---|---|---|---|
| 3,778,351 A | 12/1973 | Rosov | |
| 3,991,616 A | 11/1976 | Stahli | |
| 4,215,092 A | 7/1980 | Leskinen et al. | |
| 4,237,095 A | 12/1980 | Suovaniemi et al. | |
| 4,734,261 A | 3/1988 | Koizumi et al. | |
| 5,409,127 A * | 4/1995 | Stratford | B65D 1/30 220/23.6 |
| 6,143,252 A | 11/2000 | Haxo, Jr. et al. | |
| 6,159,368 A | 12/2000 | Moring et al. | |
| 6,558,631 B1 * | 5/2003 | Day | B01L 3/5085 422/549 |
| 6,923,938 B2 | 8/2005 | Cote et al. | |
| 6,982,063 B2 | 1/2006 | Hamel et al. | |
| 7,335,337 B1 | 2/2008 | Smith | |
| 7,968,056 B2 | 6/2011 | Stockwell | |
| 8,118,167 B2 | 2/2012 | Togashi et al. | |
| D675,748 S | 2/2013 | Hilligoss et al. | |
| D677,400 S | 3/2013 | Bucher et al. | |
| D680,226 S | 4/2013 | Motadel et al. | |
| 8,485,357 B2 | 7/2013 | Song et al. | |
| 8,591,832 B2 | 11/2013 | Nelson | |
| D694,907 S | 12/2013 | Okihara | |
| D694,908 S | 12/2013 | Okihara | |
| 9,084,993 B2 | 7/2015 | Naumann et al. | |
| D804,050 S | 11/2017 | Coulling et al. | |
| D804,052 S | 11/2017 | Dadachanji et al. | |
| D815,753 S | 4/2018 | Curry et al. | |
| D824,535 S | 7/2018 | Curry et al. | |
| D848,638 S | 5/2019 | Sims et al. | |
| D861,190 S | 9/2019 | Potdar et al. | |
| D867,614 S | 11/2019 | Jones et al. | |
| 10,821,434 B2 | 11/2020 | Cote | |
| D905,267 S | 12/2020 | Cote | |
| 2002/0086440 A1 | 7/2002 | Lehtinen et al. | |
| 2002/0125197 A1 | 9/2002 | Hager et al. | |
| 2002/0146353 A1 | 10/2002 | Bevirt et al. | |
| 2004/0071602 A1 | 4/2004 | Mu | |
| 2004/0231438 A1 | 11/2004 | Schwartz | |
| 2007/0048188 A1 | 3/2007 | Bigus | |
| 2007/0221684 A1 | 9/2007 | Steinbrenner et al. | |
| 2009/0129985 A1 | 5/2009 | Ikushima | |
| 2010/0252579 A1 | 10/2010 | Steinbrenner et al. | |
| 2011/0268628 A1 | 11/2011 | Warhurst et al. | |
| 2011/0286897 A1 | 11/2011 | Uschkureit et al. | |
| 2012/0103861 A1 | 5/2012 | Song et al. | |
| 2012/0258026 A1 | 10/2012 | Naumann | |
| 2013/0047751 A1 | 2/2013 | Voss et al. | |
| 2013/0078624 A1 | 3/2013 | Holmes et al. | |
| 2016/0167041 A1 | 6/2016 | Curry et al. | |
| 2017/0354965 A1 | 12/2017 | Cote | |
| 2018/0117584 A1 | 5/2018 | Cote | |
| 2020/0330980 A1 | 10/2020 | Cote | |
| 2021/0008542 A1 | 1/2021 | Cote | |
| 2021/0220819 A9 | 7/2021 | Cote | |
| 2022/0143602 A1 * | 5/2022 | Sims | B01L 9/06 |

FOREIGN PATENT DOCUMENTS

| | | |
|---|---|---|
| WO | 2013/181163 A1 | 12/2013 |
| WO | 2016/081595 A1 | 5/2016 |
| WO | 2016/094553 A1 | 6/2016 |
| WO | 2020/198347 A2 | 10/2020 |

OTHER PUBLICATIONS

International Preliminary Report on Patentability mailed on Jan. 30, 2014 in International Patent Application No. PCT/US2012/045925, filed on Jul. 9, 2012, 8 pages.

International Preliminary Report on Patentability mailed on Jun. 1, 2017 in International Patent Application No. PCT/US2015/061329, filed on Nov. 18, 2015, 9 pages.

International Preliminary Report on Patentability mailed on Oct. 7, 2021 in International Patent Application No. PCT/US2020/024696, filed on Mar. 25, 2020, 27 pages.

International Search Report and Written Opinion mailed on Dec. 7, 2012 in International Patent Application No. PCT/US2012/045925, filed on Jul. 9, 2012, 9 pages.

International Search Report and Written Opinion mailed on Jan. 29, 2016 in International Patent Application No. PCT/US2015/061329, filed on Nov. 18, 2015, 10 pages.

International Search Report and Written Opinion mailed on Nov. 26, 2020 in International Patent Application No. PCT/US2020/024696, filed on Mar. 25, 2020, 38 pages.

Office Action dated Apr. 6, 2018 in U.S. Appl. No. 14/131,278, filed Apr. 29, 2014 and published as US 2018-0117584 on May 3, 2018, 6 pages.

Office Action dated Aug. 27, 2018 in U.S. Appl. No. 14/131,278, filed Apr. 29, 2014 and published as US 2018-0117584 on May 3, 2018, 10 pages.

Office Action dated Feb. 4, 2019 in U.S. Appl. No. 14/131,278, filed Apr. 29, 2014 and published as US 2018-0117584 on May 3, 2018, 11 pages.

Office Action dated Jan. 7, 2020 in U.S. Appl. No. 14/131,278, filed Apr. 29, 2014 and published as US 2018-0117584 on May 3, 2018, 11 pages.

Office Action dated Jul. 15, 2019 in U.S. Appl. No. 14/131,278, filed Apr. 29, 2014 and published as US 2018-0117584 on May 3, 2018, 8 pages.

Office Action dated Jun. 23, 2020 in U.S. Appl. No. 15/527,419, filed May 17, 2017 and published as US 2017-0354965 on Dec. 14, 2017, 10 pages.

Office Action dated Sep. 2, 2020 in U.S. Appl. No. 29/685,275, filed Mar. 27, 2019, 7 pages.

Office Action dated Sep. 9, 2019 in U.S. Appl. No. 15/527,419, filed May 17, 2017 and published as US 2017-0354965 on Dec. 14, 2017, 19 pages.

* cited by examiner

SECTION A-A

SECTION B-B

SECTION G-G

SECTION H-H

SEGMENTED PIPETTE TIP ADAPTER

RELATED PATENT APPLICATION

This patent application is a 35 U.S.C. 371 national phase application of International Patent Cooperation Treaty (PCT) Application No. PCT/US2020/024696, filed on Mar. 25, 2020, entitled SEGMENTED PIPETTE TIP ADAPTER, naming Richard COTE as inventor. International PCT Application No. PCT/US2020/024696 claims the benefit of U.S. provisional patent application No. 62/824,660 filed on Mar. 27, 2019, entitled SEGMENTED PIPETTE TIP ADAPTER, naming Richard Cote as inventor. The entire content of each of the foregoing patent applications is incorporated herein by reference, including all text, tables, and drawings, for all purposes.

FIELD

The technology relates in part to pipette tip adapters that indirectly join an array of pipette tips to a fluid dispensing device.

BACKGROUND

Pipette tips are utilized in a variety of industries having a requirement for handling fluids, and are used in facilities including medical laboratories and research laboratories, for example. Pipette tips generally are manufactured from a moldable plastic, such as polypropylene, for example. Pipette tips are made in a number of sizes to allow for accurate and reproducible liquid handling for volumes ranging from nanoliters to milliliters.

Pipette tips can be utilized in conjunction with a variety of fluid handling devices, including manual and automated fluid handling devices, to manipulate liquid samples. Fluid handling devices that operate based on air displacement are referred to herein as “pipettors.” A pipettor is a device that, when placed in air displacement communication with a pipette, a pipette tip for example, applies negative pressure to acquire fluids, and applies positive pressure to dispense fluids. Pipette tips can be placed in air displacement communication with a pipettor via an intermediary adapter. An adapter sometimes includes nozzles disposed on the proximal portion of the adapter, which are configured to engage the pipettor, and tubular projections disposed on the distal portion of the adapter, which are configured to sealingly engage an array of pipette tips.

SUMMARY

Provided in certain aspects is a segmented pipette tip adapter that includes a plurality of plate segments and a junction between adjacent plate segments. Each of the plate segments often includes a proximal surface, a distal surface, edges, one or more nozzles disposed on the proximal surface, and one or more tubular projections disposed on the distal surface. Each of the nozzles often includes a nozzle bore, each of the tubular projections often includes a tubular projection bore, each of the plate segments often includes a plate bore disposed at each of the nozzles. In some embodiments, each nozzle bore is aligned with a tubular projection bore and a plate bore, and sometimes the bores are co-axially aligned (i.e., center vertical axis of each bore is parallel), sometimes are co-centrically aligned (i.e., center vertical axes of the bores are coincident), and sometimes are axially aligned and not co-centrically aligned (i.e., center vertical axis of each bore is parallel and not coincident). In certain embodiments, each nozzle bore is not aligned with a tubular projection bore and/or a plate bore. Each junction often is between adjacent edges of a pair of adjacent plate segments. The plurality of plate segments often are co-planar or substantially co-planar in the adapter. An adapter sometimes includes one or more connectors that join two or more adjacent plate segments, and the plurality of plate segments in an adapter sometimes are connected directly or indirectly by the one or more connectors.

Also provided in certain aspects is a cartridge assembly that includes a segmented pipette tip adapter described herein and an array of pipette tips joined to tubular projections of the adapter. Provided also in certain aspects is a fluid dispensing assembly that includes a cartridge assembly sealingly joined to a fluid dispensing device. Also provided in certain aspects is a fluid dispensing assembly that includes a cartridge assembly in combination with a rack.

Also provided in certain aspects is a mold configured to manufacture a segmented pipette tip adapter described herein, and methods for manufacturing a segmented pipette tip adapter, a cartridge assembly and a fluid dispensing assembly. Provided also in certain aspects is a method for using a fluid dispensing assembly.

Certain embodiments are described further in the following description, examples, claims and drawings.

BRIEF DESCRIPTION OF THE DRAWINGS

The drawings illustrate certain embodiments of the technology and are not limiting. For clarity and ease of illustration, the drawings are not made to scale and, in some instances, various aspects may be shown exaggerated or enlarged to facilitate an understanding of particular embodiments.

Figure 1:
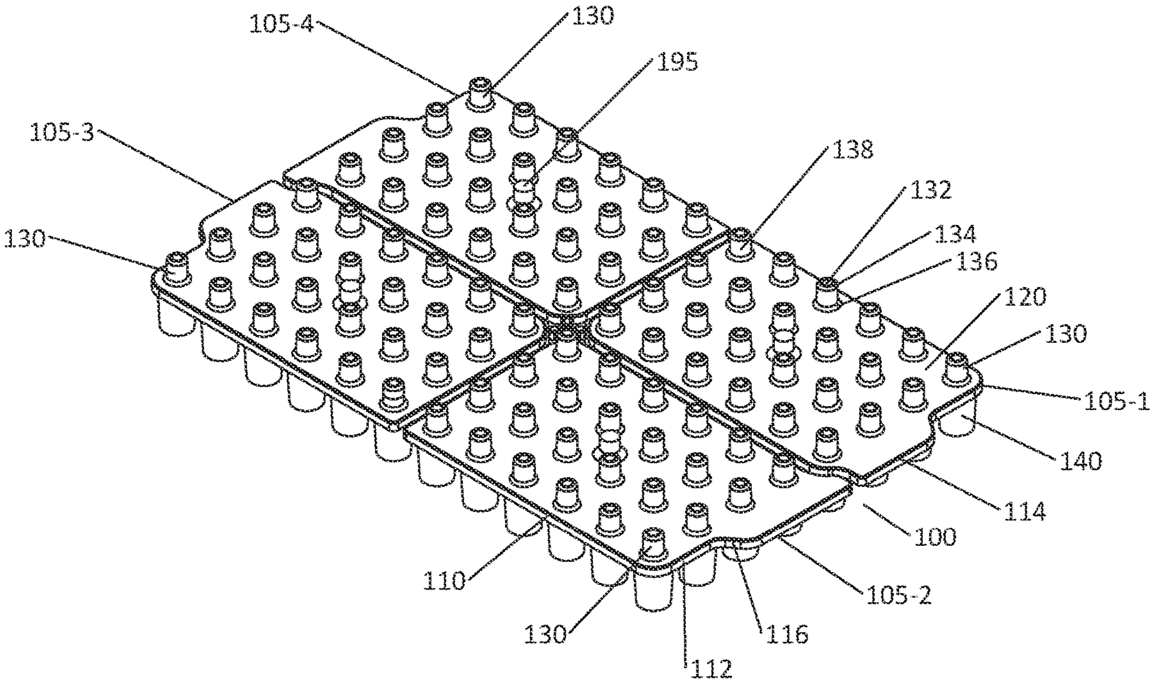
FIG. 1 is a top perspective view of pipette tip adapter embodiment 100.
Figure 2:
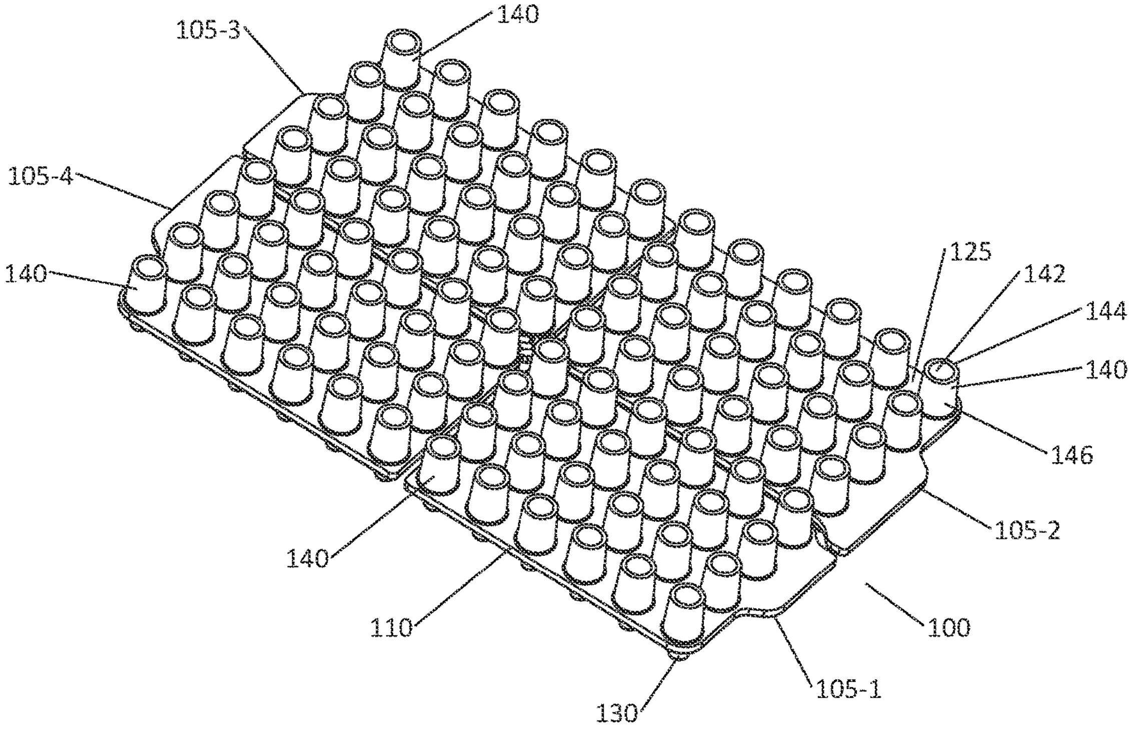
FIG. 2 is a bottom perspective view thereof.
Figure 3:
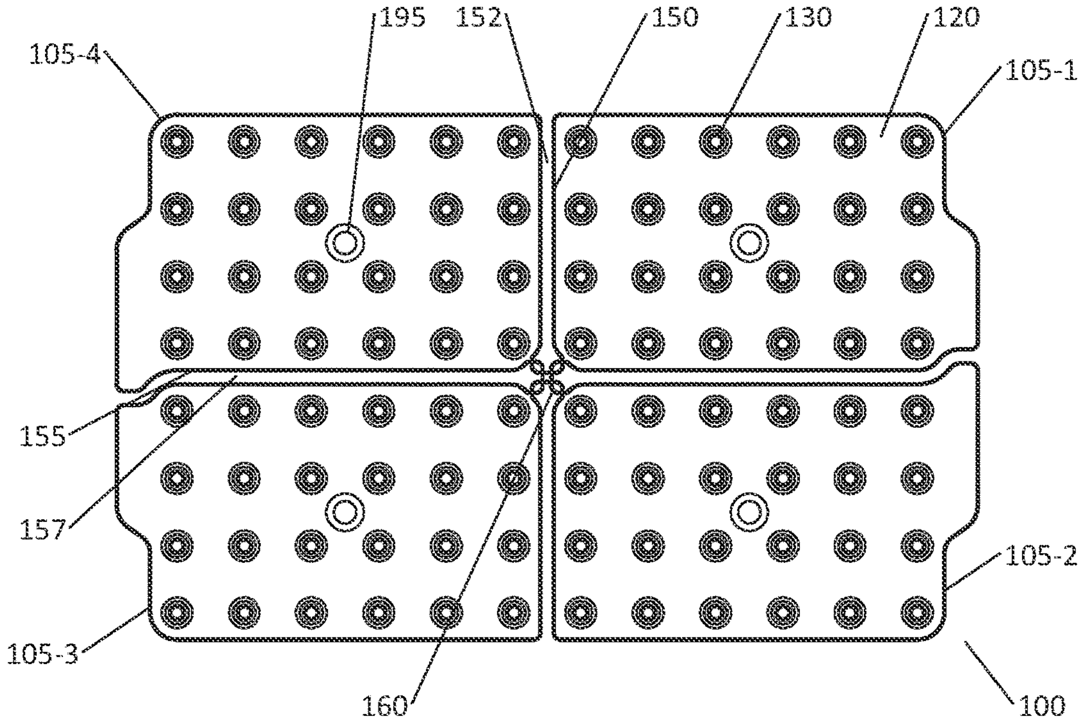
FIG. 3 is a top view thereof.
Figure 4:
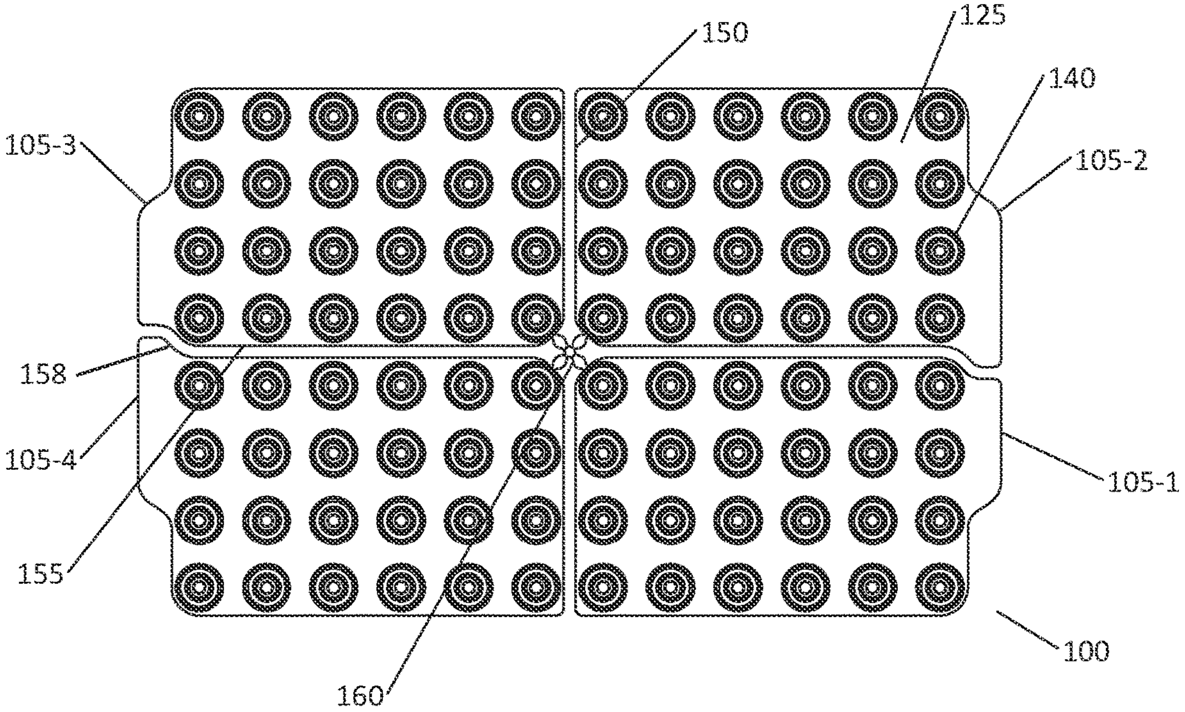
FIG. 4 is a bottom view thereof.
Figure 5:
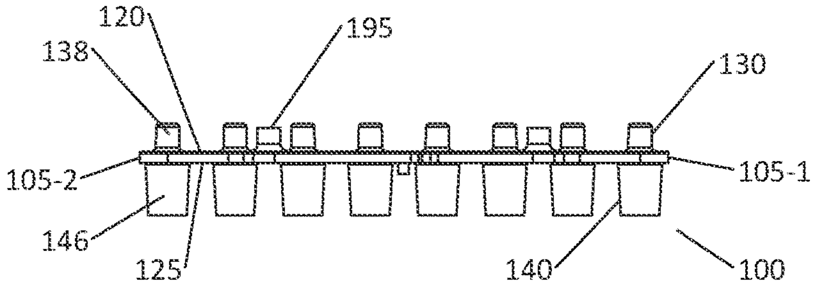
FIG. 5 is a side view thereof.
Figure 6:
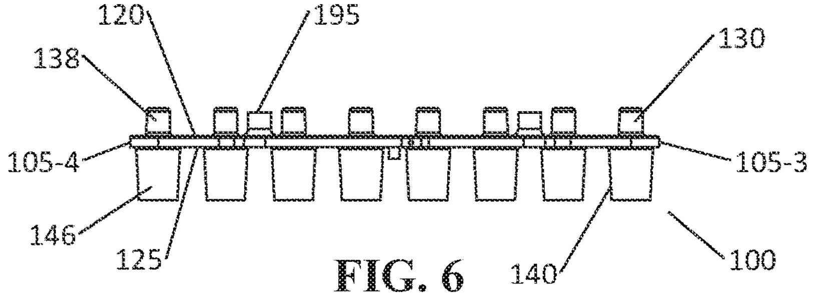
FIG. 6 is a side view thereof.
Figure 7:
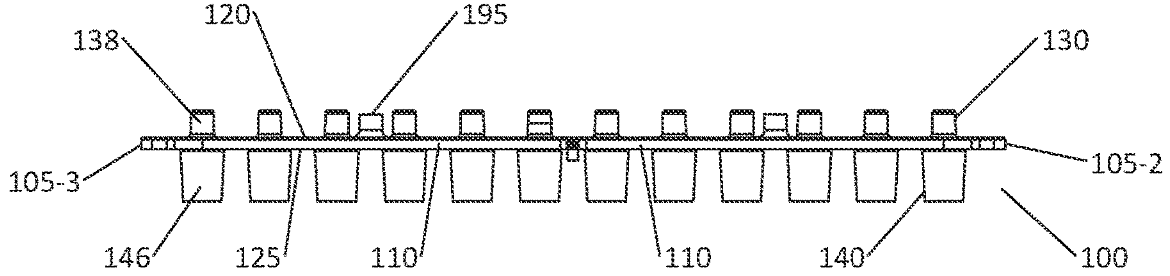
FIG. 7 is a front view thereof.
Figure 8:
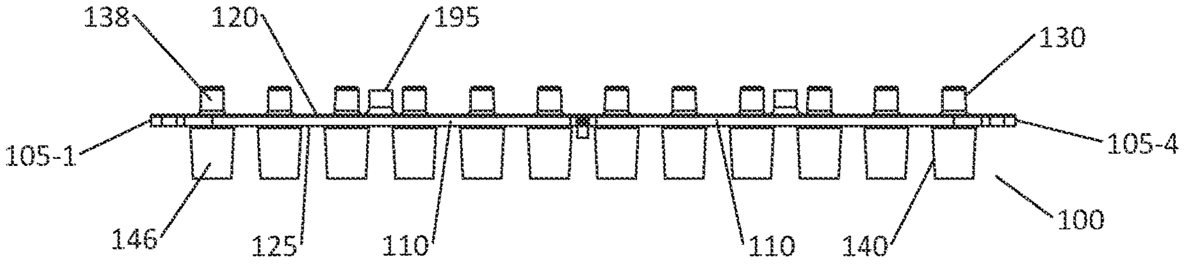
FIG. 8 is a back view thereof.
Figure 9:
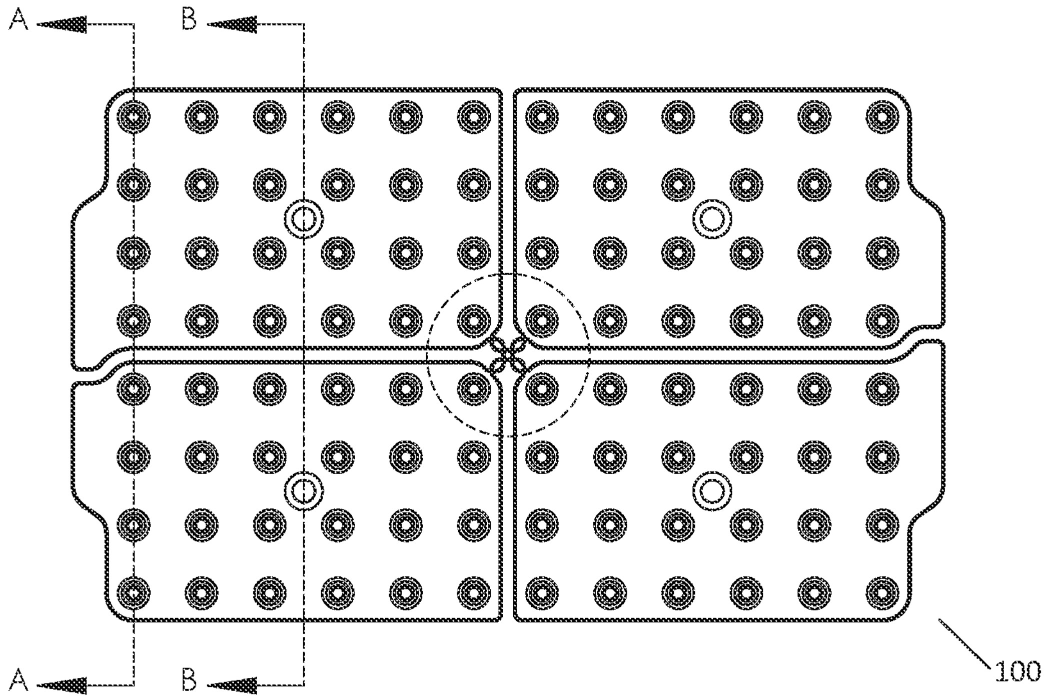
FIG. 9 is a top view thereof showing cutting planes A-A and B-B and a region delineated by a broken line circle.
Figure 10:
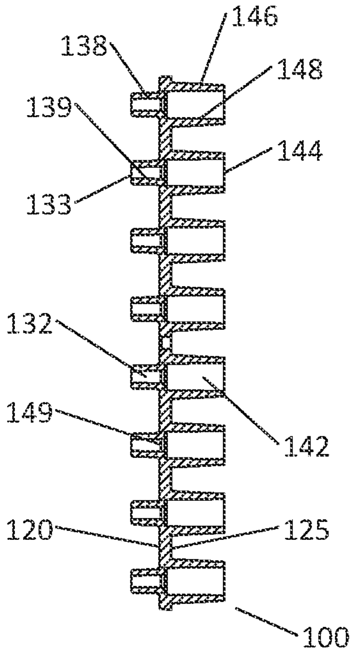
FIG. 10 is a section view thereof through cutting plane A-A shown in FIG. 9.
Figure 11:
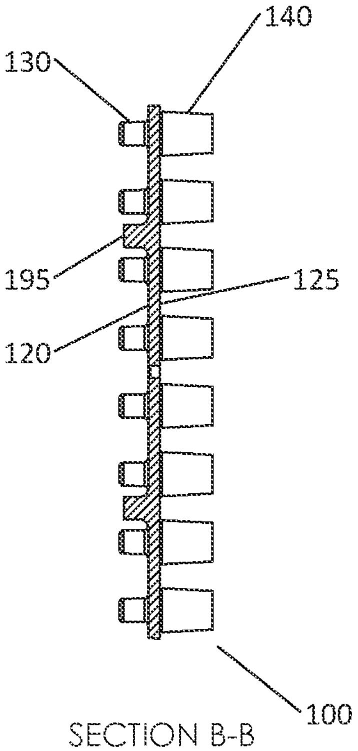
FIG. 11 is a section view thereof through cutting plane B-B shown in FIG. 9.
Figure 12:
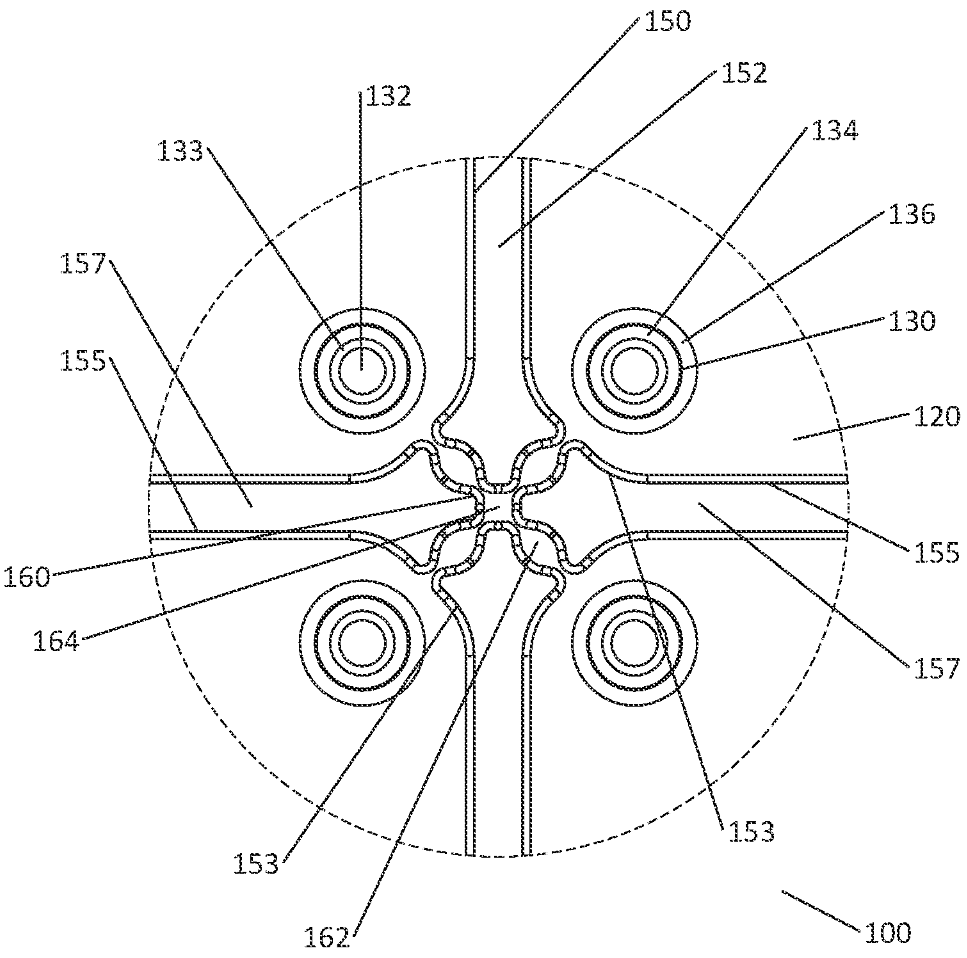
FIG. 12 is an enlarged view of the region delineated by the broken line circle shown in FIG. 9.

Certain features of drawings are described in the following Table 1.

TABLE 1

| Callout | Feature |
|---|---|
| 100 | adapter embodiment |
| 105-1, 105-2, 105-3, 105-4 | plate segment |
| 110 | segment peripheral edge |
| 112 | segment peripheral edge |
| 114 | segment peripheral edge |
| 116 | segment peripheral edge transition |
| 120 | plate proximal surface (upper surface) |
| 125 | plate distal surface (lower surface) |
| 130 | nozzle in array of nozzles |
| 132 | nozzle bore |
| 133 | nozzle proximal surface |
| 134 | nozzle chamfer |
| 136 | nozzle flange |
| 138 | nozzle sidewall exterior surface |
| 139 | nozzle sidewall interior surface |
| 140 | tubular projection in array of tubular projections |
| 142 | tubular projection bore |
| 144 | tubular projection distal surface |
| 146 | tubular projection sidewall exterior surface |
| 148 | tubular projection sidewall interior surface |
| 149 | transition between nozzle bore and tubular projection bore |
| 150, 155 | segment interior edge |
| 152, 157 | junction region between segment interior edges |
| 153, 158 | segment interior edge transition |
| 160 | segment connector (flexible connector) |
| 162 | connector peripheral member |
| 164 | connector central member |
| 195 | gate projection |
| 200 | cartridge assembly embodiment |
| 300 | pipette tip in array of pipette tips |
| 305 | pipette tip proximal region |
| 310 | pipette tip distal region |
| 315 | junction between pipette tip proximal region and pipette tip distal region |
| 316 | pipette tip collar at junction 315 |
| 320 | pipette tip rib |
| 325 | pipette tip sidewall between ribs |
| 330 | pipette tip proximal flange |
| 340 | pipette tip sidewall exterior surface |
| 345 | pipette tip sidewall interior surface |
| 350 | sealing region between pipette tip and tubular projection |
| 400 | pipettor |
| 405 | pipettor base |
| 410 | pipettor platform |
| 420 | pipettor arm |
| 430 | pipettor head |
| 500 | pipettor-cartridge assembly embodiment |
| 600 | adapter embodiment |
| 605-1, 605-2, 605-3, 605-4 | plate segment |
| 620 | plate proximal surface (upper surface) |
| 630 | nozzle in array of nozzles |
| 640 | tubular projection in array of tubular projections |
| 650, 655 | segment interior edge |
| 652 | junction region between segment interior edges |
| 653 | segment interior edge transition |
| 660 | segment connector (flexible connector) |
| 662 | connector base |
| 664 | connector edge |
| 700 | adapter embodiment |
| 705-1, 705-2, 705-3, 705-4 | plate segment |
| 720 | plate proximal surface (upper surface) |
| 730 | nozzle in array of nozzles |
| 740 | tubular projection in array of tubular projections |
| 750 | segment interior edge |
| 752 | junction region between segment interior edges |
| 760 | segment connector (flexible connector) |
| 762 | connector point |
| 764 | connector side |
| 766 | connector proximal surface |
| 770 | segment cutout |
| 772 | cutout edge |
| 800 | adapter embodiment |
| 805-1, 805-2, | plate segment |

TABLE 1-continued

| Callout | Feature |
|---|---|
| 805-3, 805-4 | |
| 820 | plate proximal surface (upper surface) |
| 830 | nozzle in array of nozzles |
| 840 | tubular projection in array of tubular projections |
| 850 | segment interior edge |
| 852 | junction region between segment interior edges |
| 860 | segment connector (flexible connector) |
| 862 | connector side |
| 864 | connector side |
| 866 | connector proximal surface |
| 870 | segment cutout |
| 872 | cutout edge |
| 900 | adapter embodiment |
| 905-1, 905-2, 905-3, 905-4 | plate segment |
| 920 | plate proximal surface (upper surface) |
| 925 | plate distal surface (lower surface) |
| 930 | nozzle in array of nozzles |
| 940 | tubular projection in array of tubular projections |
| 950, 955 | segment interior edge |
| 952, 957 | junction region between segment interior edges |
| 980 | plate proximal boundary |
| 982 | plate distal boundary |
| 984 | junction proximal boundary |
| 986 | junction distal boundary |
| 1000 | cartridge assembly embodiment |
| 1100 | adapter embodiment |
| 1105-1, 1105-2, 1105-3, 1105-4 | plate segment |
| 1110 | segment peripheral edge |
| 1112 | segment peripheral edge |
| 1114 | segment peripheral edge |
| 1116 | segment peripheral edge transition |
| 1120 | plate proximal surface (upper surface) |
| 1125 | plate distal surface (lower surface) |
| 1130 | nozzle in array of nozzles |
| 1132 | nozzle bore |
| 1133 | nozzle proximal surface |
| 1134 | nozzle chamfer |
| 1136 | nozzle flange |
| 1138 | nozzle sidewall exterior surface |
| 1139 | nozzle sidewall interior surface |
| 1140 | tubular projection in array of tubular projections |
| 1142 | tubular projection bore |
| 1144 | tubular projection distal surface |
| 1146 | tubular projection sidewall exterior surface |
| 1148 | tubular projection sidewall interior surface |
| 1149 | transition between nozzle bore and tubular projection bore |
| 1150, 1155 | segment interior edge |
| 1152, 1157 | junction region between segment interior edges |
| 1200 | pipette tip in array of pipette tips |
| 1205 | pipette tip proximal region |
| 1210 | pipette tip distal region |
| 1215 | junction between pipette tip proximal region and pipette tip distal region |
| 1216 | pipette tip collar at junction 1215 |
| 1220 | pipette tip rib |
| 1225 | pipette tip sidewall between ribs |
| 1230 | pipette tip proximal flange |
| 1240 | pipette tip sidewall exterior surface |
| 1245 | pipette tip sidewall interior surface |
| 1250 | sealing region between pipette tip and tubular projection |
| 1300 | rack assembly embodiment |
| 1400 | rack |
| 1405 | rack top surface |
| 1410 | rack proximal side surface |
| 1415 | rack proximal side surface |
| 1417 | rack transition from proximal side surface to distal side surface |
| 1418 | rack transition from proximal side surface to distal side surface |
| 1420 | rack distal side surface |
| 1425 | rack distal side surface |
| 1430 | rack flange side surface |
| 1431 | rack flange side surface |
| 1435 | transition between rack distal side surface and rack flange surface |
| 1436 | transition between rack distal side surface and rack flange surface |
| 1440 | rack bottom surface |
| 1445 | rack flange distal surface |
| 1445 | rack flange distal surface |
| 1450 | rack flange rear surface |
| 1451 | rack flange rear surface |
| 1460 | rack body |
| 1465 | bore opening |
| 1470 | bore |
| 1475 | bore sidewall |

DETAILED DESCRIPTION

Relative terms such as “distal” or “lower,” “proximal” or “upper,” “horizontal,” “vertical,”, “above,” “below,” “up,” “down,” “top” and “bottom” as well as derivatives thereof (e.g., “horizontally,” “downwardly,” “upwardly,” etc.) should be construed to refer to the orientation as then described or as shown in the drawing under discussion. These relative terms are for convenience of description and do not require that the apparatus be constructed or operated in a particular orientation. Terms concerning attachments, coupling and the like, such as “connected” and “interconnected,” refer to a relationship wherein structures are secured or attached to one another either directly or indirectly through intervening structures, as well as both movable or rigid attachments or relationships, unless expressly described otherwise.

Segmented pipette tip adapters provided herein include plate segments each having a substantially flat proximal surface and one or more junctions between plate segments. When joining an adapter assembly containing pipette tips to a pipettor, each plate segment includes one or more nozzles that associate with a pipettor member. When an adapter is joined to a pipettor, the proximal surface of each plate segment often is joined to a flat or substantially flat distal surface of a fluid dispensing device member. An adapter assembly containing an array of pipette tips also can be associated with a rack. A rack often includes a pipette tip receptacle plate and a rack generally is configured to receive, present and store an array of pipette tips. The distal surface or each plate segment of an adapter often is in contact with, or adjacent to, the proximal terminus of each pipette tip when the adapter assembly is associated with the rack.

In some embodiments, a flexible unitary adapter, in which plate segments (i) are directly or indirectly connected by connectors, and (ii) are capable of independent or semi-independent movement at the junctions, is associated with a member of a fluid dispensing device or rack having a flat or substantially flat surface. In certain embodiments, plate segments of a frangible adapter, in which the plate segments have been dissociated and are not connected, are associated with a member of a fluid dispensing device or rack having a flat or substantially flat surface. The spatial orientation of each plate segment generally can be altered independently or semi-independently with respect to an adjacent plate segment in the adapters. This feature facilitates conformation of the adapter to the flat or substantially flat surface (e.g., mating surface) of the fluid dispensing device or rack.

This ability of a segmented adapter to conform to a flat or substantially flat surface (e.g., mating surface) can provide several advantages. Non-limiting examples of such advantages include (i) efficient separation of pipette tips associated with the adapter from a rack containing the pipette tips, and (ii) precise and accurate placement of pipette tip termini (e.g., in receiving wells) by a fluid handling device. Without being bound by theory, these advantages are expected to result from a reduction or abrogation of pipette tips splaying when a segmented adapter is joined and conformed to a flat or substantially flat surface of a fluid dispensing device. Another non-limiting example of an advantage is efficient air displacement communication between the pipette tips and fluid dispensing device associated with the adapter. Without being bound by theory, this latter advantage is expected to (i) result in reduced or abrogated pipette tip leaking, enhanced fluid dispensing precision and accuracy, and (ii) compensate for molding inaccuracies and temperature-induced expansion or contraction of the adapter that can cause leaking and reduced fluid dispensing precision and accuracy.

For frangible adapter embodiments, plate segments of an adapter can be dissociated (i) before a segmented adapter is joined to an array of pipette tips, (ii) after a segmented adapter is joined to an array of pipette tips, (iii) before a segmented adapter is provided for association of the adapter with a fluid handling device, or (iv) after a segmented adapter is provided for association of the adapter with a fluid handling device, for example. In frangible segmented adapter embodiments, a unitary segmented adapter often is manufactured and sometimes is provided to an operator. Non-limiting methods for dissociating plate segments in a unitary segmented adapter include removing connectors (e.g., punching out connectors), breaking connectors, and/or breaking junctions (e.g., snapping perforated junctions, snapping grooved junctions, breaking at junctions containing a material softer or more brittle than the material of the plate segments), as applicable. All plate segments sometimes are dissociated in a frangible unitary segmented adapter. In some embodiments, a subset of plate segments is dissociated in a frangible unitary segmented adaptor and the dissociated plate segments can be utilized together or separately from one another. For example, a disassociated segment can be utilized separately from the connected plate segments in the remaining unitary portion of the segmented adapter.

Segmented Pipette Tip Adapters

In some embodiments, a segmented pipette tip adapter includes a plurality of plate segments and one or more junctions between the plate segments. Each of the plate segments often includes a proximal surface, a distal surface, edges, one or more nozzles disposed on the proximal surface and one or more tubular projections disposed on the distal surface. Each of the nozzles often includes a nozzle bore, each of the tubular projections includes a tubular projection bore, each of the plate segments includes a plate bore disposed at each of the nozzles, and each nozzle bore is aligned with a tubular projection bore and a plate bore. Each of the junctions often is between adjacent edges of a pair of adjacent plate segments in the adapter.

The plurality of plate segments often are co-planar or substantially co-planar in an adapter. The proximal surface and/or the distal surface of each of the plate segments often is/are flat or substantially flat, and can be of any useful geometry. Plate segments in an adapter sometimes have the same geometry. In some embodiments, one or more plate segments have a geometry different from one or more other plate segments in the adapter. Non-limiting examples of plate segment geometry include quadrilateral, square, rectangular, trapezoid, rhombus, parallelogram, triangle, polygon, pentagon, hexagon, star, X-shape, Y-shape, Z-shape, C-shape, S-shape, sigmoid, circle, oval and the like.

Adjacent edges of adjacent plate segments sometimes are joined at each of the junctions in an adapter. In some embodiments, there is no distance, or a maximum distance of 0.005 inches or less, separating the adjacent plate segments at each of the junctions. In certain embodiments, adjacent edges of adjacent plate segments are separated by a distance at each of the junctions. The distance sometimes is uniform or substantially uniform for each of the junctions, and in some embodiments the distance is not uniform for each of the junctions in an adapter. In certain embodiments, each of the junctions is a void, and sometimes each of the junctions is a slot.

An adapter sometimes is unitary, and the plurality of plate segments sometimes are connected directly or indirectly by one or more connectors. The one or more connectors often permit independent or semi-independent displacement of a first plate segment relative to an adjacent second plate segment connected to the first plate segment. A unitary adapter sometimes is frangible. A frangible adapter sometimes includes separable junctions (e.g., junctions that include perforations), and sometimes includes destructible and/or removable connectors, which can facilitate dissociation of plate segments in an adapter.

In certain embodiments pertaining to adapters that include one or more connectors, a connector is a flexible connector that sometimes includes a flexible tether. In certain embodiments, one or more connectors are disposed in one or more of the junctions, and sometimes one or more connectors are co-planar with the adapter plate segments. In some embodiments, each of the plate segments includes a cutout adjacent to a connector. In certain embodiments, one or more connectors are disposed outside the junctions, and sometimes one or more connectors are not co-planar with the adapter plate segments. In some embodiments, each of the plate segments includes an interior edge, and one or more connectors are connected to a portion of the interior edge. In certain embodiments, one or more connectors are connected to a portion of the proximal surface, or the distal surface, or the proximal surface and the distal surface, of two adjacent plate segments.

In some embodiments, a connector connects two or more plate sections, and sometimes a connector connects four or more plate sections. A connector sometimes includes a center member and a plurality of peripheral members each connected to one of the plate sections. A connector is of any suitable geometry, and a connector sometimes includes or consists of a S-shaped, C-shaped, Y-shaped, X-shaped, U-shaped or V-shaped member. Non-limiting examples of connectors are shown in the drawings. For connectors 660, 760 and 860 illustrated in FIG. 24 to FIG. 29, for example, one or more of each connector unit shown can be incorporated, in any suitable combination, for connection of adjacent plate segments in an adapter.

In certain embodiments, a connector is continuously disposed in each of the junctions. In some embodiments, one or more junctions include perforations. In certain embodiments, the plate segments and the connectors consist of the same material. Sometimes the plate includes segments that include or consist of a first material and the connectors include or consist of a second material different than the first material. In some embodiments, one or more connectors are of a thickness less than the thickness of each of the plate segments, and sometimes one or more connectors are continuously disposed in each of the junctions and define a groove in the junctions. In certain embodiments, one or more connectors are of a thickness the same as or about the same as the thickness of each of the plate segments (e.g., when connectors are in the junctions). In some embodiments, one or more connectors are continuously disposed in each of the junctions, each of the plate segments include or consist of a first material and one or more connectors include or consist of a second material, where the second material (i) is different than the first material and (ii) has a greater flexibility than the first material. In some embodiments, the plate segments, or one or more connectors, or the plate segments and one or more connectors, are manufactured from a moldable polymer (non-limiting examples are provided herein), and sometimes contain or consist of polypropylene. In certain embodiments, one or more connectors contain or consist of an elastomer (non-limiting examples are provided herein).

In some embodiments, one or more of the junctions include a linear junction portion, sometimes one or more of the junctions include a curved junction portion, and sometimes one or more of the junctions include a linear junction portion and a curved junction portion. In some embodiments, each of the junctions is linear.

In certain embodiments, each of the plate segments includes a plurality of nozzles disposed in an array of nozzles, and a plurality of tubular projections disposed in an array of tubular projections. Each of the plate segments sometimes includes the same array of nozzles (i.e., the same number of nozzles and/or the same spatial arrangement of nozzles) and the same array of tubular projections (i.e., the same number of tubular projections and/or the same spatial arrangement of tubular projections). In some embodiments, the nozzle bore of each of the nozzles is concentric with the tubular projection bore of the aligned tubular projection. In certain embodiments, one or more of the plate bores includes a conical surface, and sometimes one or more of the plate bores includes a stepped surface or curved surface. In certain embodiments, each of the nozzles is configured to seal with a fluid dispensing device member. In some embodiments, a sidewall exterior surface of each of the nozzles is configured to seal with a fluid dispensing device member. A sidewall exterior surface of each of the nozzles sometimes includes a cylindrical portion and a chamfer portion disposed proximal to the cylindrical portion. In certain embodiments, each of the tubular projections is configured to seal with a pipette tip. In some embodiments, a sidewall exterior surface of each of the tubular projections is configured to seal with a sidewall interior surface of a pipette tip. A sidewall exterior surface of each of the tubular projections sometimes is frustum-shaped or conical (i.e., cone-shaped). In some embodiments, each plate segment includes one or more ribs (i) disposed on the distal surface and/or the proximal surface, and (ii) optionally in connection with nozzle(s) and/or tubular projection(s), as applicable, which can function to rigidify the plate segments.

FIG. 1 to FIG. 12 illustrate a non-limiting example of a segmented pipette tip adapter. Adapter embodiment 100 includes four plate segments, i.e., plate segment 105-1, 105-2, 105-3 and 105-4, and other adapter embodiments can include a different number of plate segments (e.g., 2, 3, 5, 6, 7, 8, 9, 10 or more plate segments) arranged in any suitable orientation (e.g., a single row, multiple rows). Adapter embodiment 100 includes segment peripheral edges 110, 112 and 114, segment peripheral edge transition 116, plate proximal surface (upper surface) 120 and plate distal surface (lower surface) 125. The edge transition 116 generally is S-shaped in adapter embodiment 100, and other adapter embodiments can include an edge transition having a different geometry (e.g., right angle transition) or no transition (e.g., continuously linear edge).

Adapter embodiment 100 includes a plurality of nozzles presented in an array, where each nozzle 130 is in connection with and extends from the proximal surface of each plate segment, and each plate segment includes the same array configuration of nozzles (i.e., 4 by 6 array). In certain adapter embodiments, nozzles of one plate segment, a subset of plate segments or all plate segments can be arranged in a different array configuration than shown for adapter embodiment 100 (e.g., an array other than a 4 by 6 array). In some adapter embodiments, each plate segment includes the same array and number of nozzles as each of the other plate segments. In certain adapter embodiments, at least one plate segment includes a different array configuration and/or number of nozzles compared to at least one other plate segment in the adapter. In certain embodiments, an adapter plate segment includes a single row of nozzles.

Each of the nozzles of a pipette tip adapter, such as adapter embodiment 100, is configured to sealingly and releasably connect with receiving members of a pipettor device. Each nozzle 130 in adapter embodiment 100 includes a nozzle bore 132, nozzle proximal surface 133, nozzle sidewall exterior surface 138 and nozzle sidewall interior surface 139. The thickness between the nozzle sidewall exterior surface and the nozzle sidewall interior surface may be continuous or discontinuous. One nozzle, a subset of nozzles or all nozzles of an adapter can optionally include a nozzle chamfer at the proximal portion of the nozzle (e.g., chamfer 134 as shown in adapter embodiment 100), which can facilitate engagement of a nozzle with a corresponding receiving member of a pipettor device. One nozzle, a subset of nozzles or all nozzles of an adapter can optionally include a nozzle flange at the distal portion of the nozzle, optionally transitioning from the proximal surface the plate segment to the nozzle sidewall (e.g., flange 136 as shown in adapter embodiment 100).

Adapter embodiment 100 includes a plurality of tubular projections presented in an array, where each tubular projection 140 is in connection with and extends from the distal surface of each plate segment, and each plate segment includes the same array configuration of tubular projections (i.e., 4 by 6 array). In certain adapter embodiments, tubular projections of one plate segment, a subset of plate segments or all plate segments of an adapter can be arranged in a different array configuration than shown in adapter embodiment 100 (e.g., an array other than a 4 by 6 array). In some adapter embodiments, each plate segment includes the same array configuration and number of tubular projections as each of the other plate segments. In certain adapter embodiments, at least one plate segment includes a different array configuration and/or number of tubular projections compared to at least one other plate segment in the adapter. In certain embodiments, an adapter plate segment includes a single row of nozzles.

Each of the tubular projections, such as the tubular projections in adapter embodiment 100, is configured to sealingly and releasably connect with a sealing region of a corresponding pipette tip. Each tubular projection 140 in adapter embodiment 100 has a frustum geometry, or a portion of a conical geometry. Tubular projections of other adapter embodiments can have a different geometry suitable to sealing engage with a pipette tip (e.g., cylindrical geometry). The exterior surface of each tubular projection 140 in adapter embodiment 100 is configured to sealing engage with an interior surface of a sealing region located in a proximal region of a pipette tip. Tubular projections in other adapter embodiments can engage with a pipette tip in a different manner (e.g., an interior surface of a tubular projection can engage with an exterior surface of a pipette tip). Each tubular projection of adapter embodiment 100 includes a tubular projection bore 142, a tubular projection distal surface 144, a tubular projection sidewall exterior surface 146, and a tubular projection sidewall interior surface 148. The thickness between the tubular projection sidewall exterior surface and the tubular projection sidewall interior surface may be continuous or discontinuous.

In adapter embodiment 100, each nozzle 130 is aligned with a corresponding tubular projection 140. There is a transition 149 between each nozzle bore and each corresponding tubular projection bore in adapter embodiment 100. Each nozzle 130 is concentric with each corresponding tubular projection 140 in adapter embodiment 100. In other adapter embodiments, each nozzle 130 may be non-concentric or offset with respect to a corresponding tubular projection 140 where at least a portion of the nozzle bore is in air-displacement communication with at least a portion of the corresponding tubular projection bore.

Each plate segment in adapter embodiment 100 includes segment interior edge 150 disposed at a 90 degree angle (or angle of about 90 degrees) with respect to interior edge 155, and junctions 152 and 157 between the plate segment interior edges. Adapter embodiment 100 includes plate segment interior edge transition 153 (between edges 150 and 155 in each plate segment), which is curved, and segment interior edge transition 158, which generally is S-shaped. In other adapter embodiments, one plate segment, a subset of plate segments or all plate segments can include an edge transition having a different geometry (e.g., a right angle corner replacing curved transition 153), or no edge transition at a particular edge location (e.g., continuous linear edge replacing transition 158). The junctions between plate segments in adapter embodiment 100 are spaced junctions, having a generally continuous distance between plate segment edges greater than 0.005 inches. In certain adapter embodiments, two or more or all plate segments may abut one other, and there may be no junction or no appreciable junction (e.g., space between plate segment edges of 0.005 inches or less) between plate segment edges. In certain adapter embodiments, there may be a gap between edges of two or more or all plate segments, and the gap may be continuous or discontinuous.

Adapter embodiment 100 includes one flexible segment connector 160 that connects all plate segments, which includes a connector peripheral member 162 that is part of a set of four connector peripheral members distributed in an X-shaped configuration around connector central member 164. Each connector peripheral member 162 is connected to a plate segment at edge transition 153. Connector 160 in adapter embodiment 100 generally is co-planar with the co-planar plate segments and generally is located in the junctions between plate segments. Connector 160 is flexible as it permits at least one plate segment to translate out of plane with respect to an adjacent plate segment, and permits at least one plate segment to be disposed in the same plane as an adjacent plate segment. Connector 160 may be removed from adapter embodiment 100, and may be removed from adapter embodiment 100 in a process for manufacturing an adapter assembly, as described herein.

Adapter embodiments distinct from adapter embodiment 100 can include (i) a plurality of connectors instead of a single connector, (ii) one or more connectors having a different geometry than connector 160, (iii) one or more connectors connected at a different location on plate segments than locations at which connector 160 is connected, (iv) one or more connectors disposed in a different plane than the plate segments, (v) one or more connectors disposed outside of a junction between two adjacent plate segments, (vi) non-flexible connectors, and (vii) a combination of two or more of (i) to (vi). For example, adapter embodiment 600 illustrated in FIG. 24 and FIG. 25 includes multiple connectors (i.e., two connectors between adjacent plate segments). Each connector 660 is a flexible connector (e.g., the connector permits at least one plate segment to translate out of plane with respect to an adjacent plate segment, and permits at least one plate segment to be disposed in the same plane as an adjacent plate segment). Each connector 660 in adapter embodiment 600 is connected to a plate segment at connector base 662 and includes a connector edge 664. Each connector 660 is curved, C-shaped, is connected to the proximal surface of each plate segment at connector base 662, and is disposed outside of the junction between adjacent plate segments and in a different plane than the plate segments (i.e., the portion of the connector at the mid-point of the junction between adjacent plate segments is disposed outside of the junction and above the proximal surface of each adjacent plate that it connects). In some embodiments, each connector 660 is removed.

Figure 26:
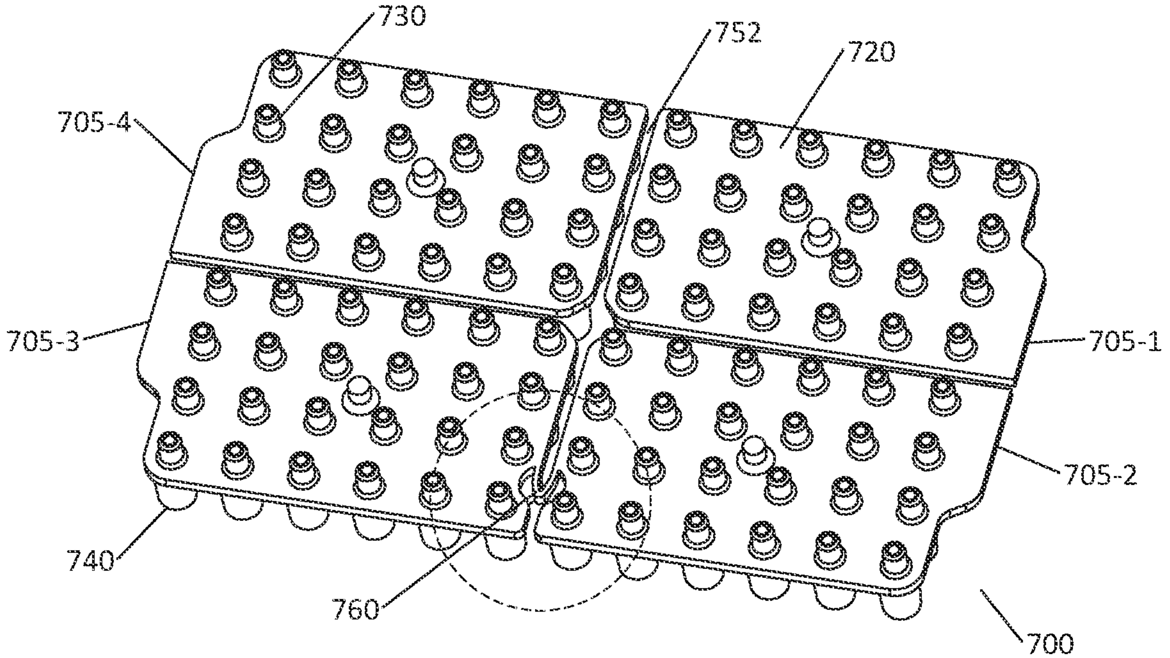
FIG. 26 is a top perspective view of pipette tip adapter embodiment 700, which shows a region delineated by a broken line circle.
Figure 27:
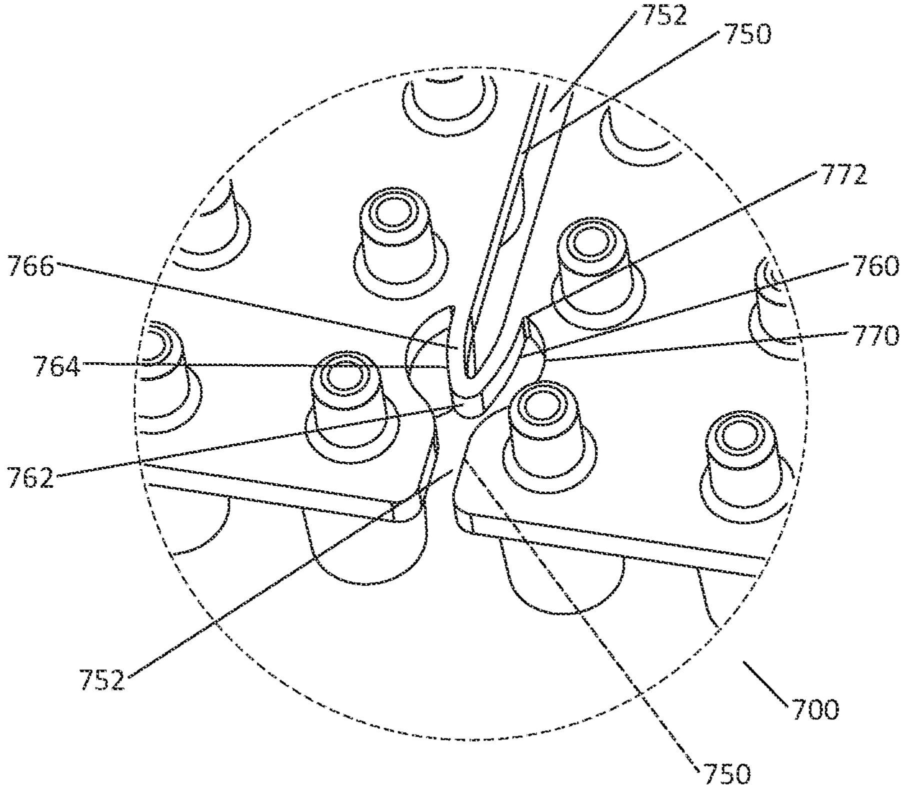
FIG. 27 is an enlarged view of the region delineated by the broken line circle present in FIG. 26.

In another example, adapter embodiment 700 illustrated in FIG. 26 and FIG. 27 includes a generally flexible connector 760 (e.g., the connector permits at least one plate segment to translate out of plane with respect to an adjacent plate segment, and permits at least one plate segment to be disposed in the same plane as an adjacent plate segment). Connector 760 generally is disposed in the junction between adjacent plate segments (i.e., in the same plane as adjacent plate segments). Connector 760 may be present between two or more adjacent plate segments in an adapter (e.g., at least one connector 760 between all adjacent plate segments in an adapter). Connector 760 is generally U-shaped, or wishbone-shaped, and includes a connector point 762, connector side 764 and connector proximal surface 766. Connector 760 is adjacent to a plate segment cutout 770 having a cutout edge 772 in the plate segment adjacent to connector side 764 and connector in adapter 700, and alternatively, the cutout generally may follow the contour of the adjacent connector side (i.e., the radius of the cutout and the connector side may be the same or substantially the same) in alternative adapter embodiments. In some embodiments, each connector 760 is removed.

Figure 28:
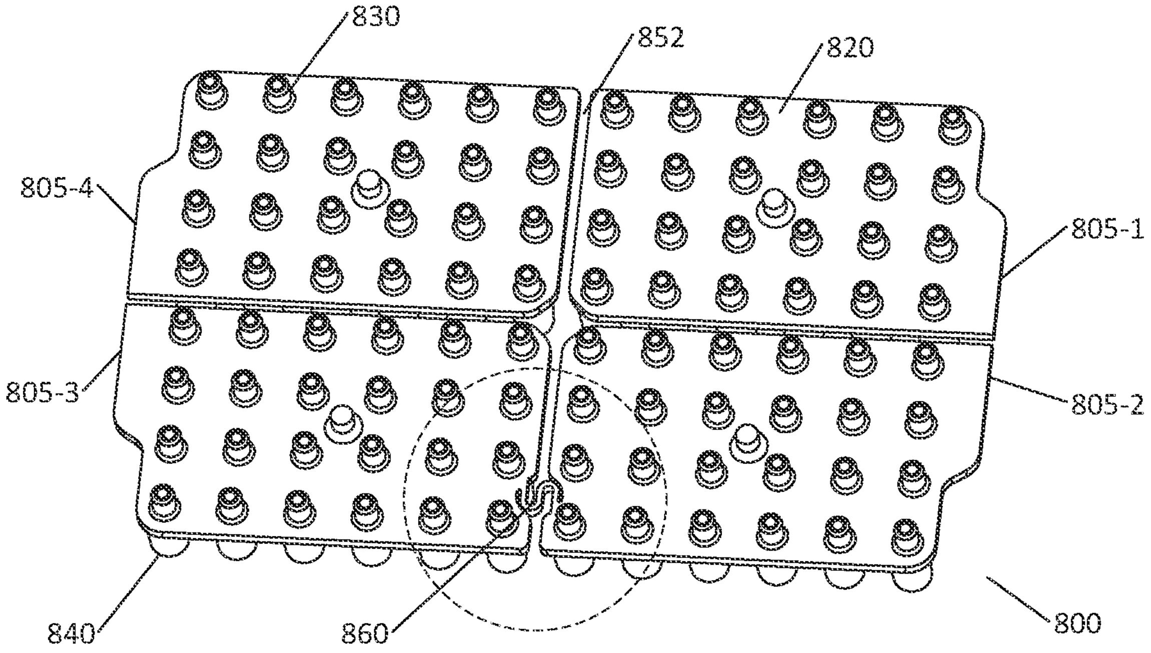
FIG. 28 is a top perspective view of pipette tip adapter embodiment 800, which shows a region delineated by a broken line circle.
Figure 29:
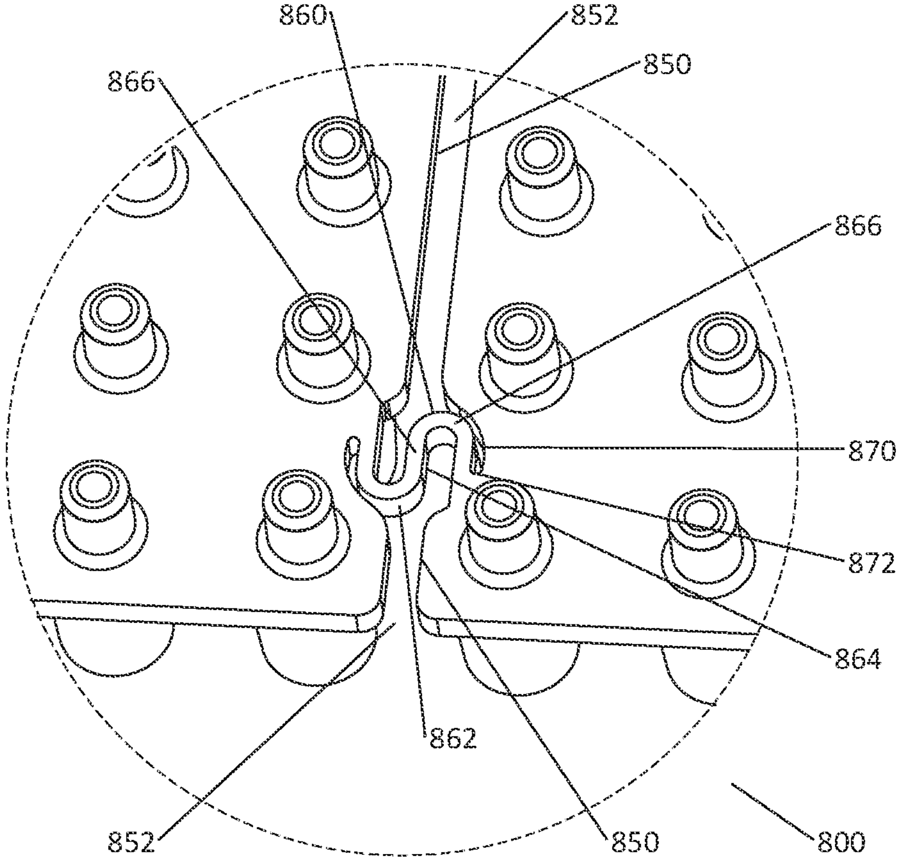
FIG. 29 is an enlarged view of the region delineated by the broken line circle present in FIG. 28.

In another example, adapter embodiment 800 includes a generally S-shaped connector 860 illustrated in FIG. 28 and FIG. 29. Connector 860 generally is a flexible connector (e.g., the connector permits at least one plate segment to translate out of plane with respect to an adjacent plate segment, and permits at least one plate segment to be disposed in the same plane as an adjacent plate segment). Connector 860 generally is disposed in the junction between adjacent plate segments (i.e., in the same plane as adjacent plate segments). Connector 860 may be present between two or more adjacent plate segments in an adapter (e.g., at least one connector 860 between all adjacent plate segments in an adapter). Connector 860 includes a connector side 862, connector side 864 and connector proximal surface 866. Connector 860 is adjacent to a plate segment cutout 870 and cutout edge 872 generally following the contour of the adjacent connector side. In alternative adapter embodiments, the cutout does not follow the contour of the adjacent connector side, and the radius of the cutout may differ than the radius of the adjacent connector side, in alternative adapter embodiments. In some embodiments, each connector 860 is removed.

Figure 30:
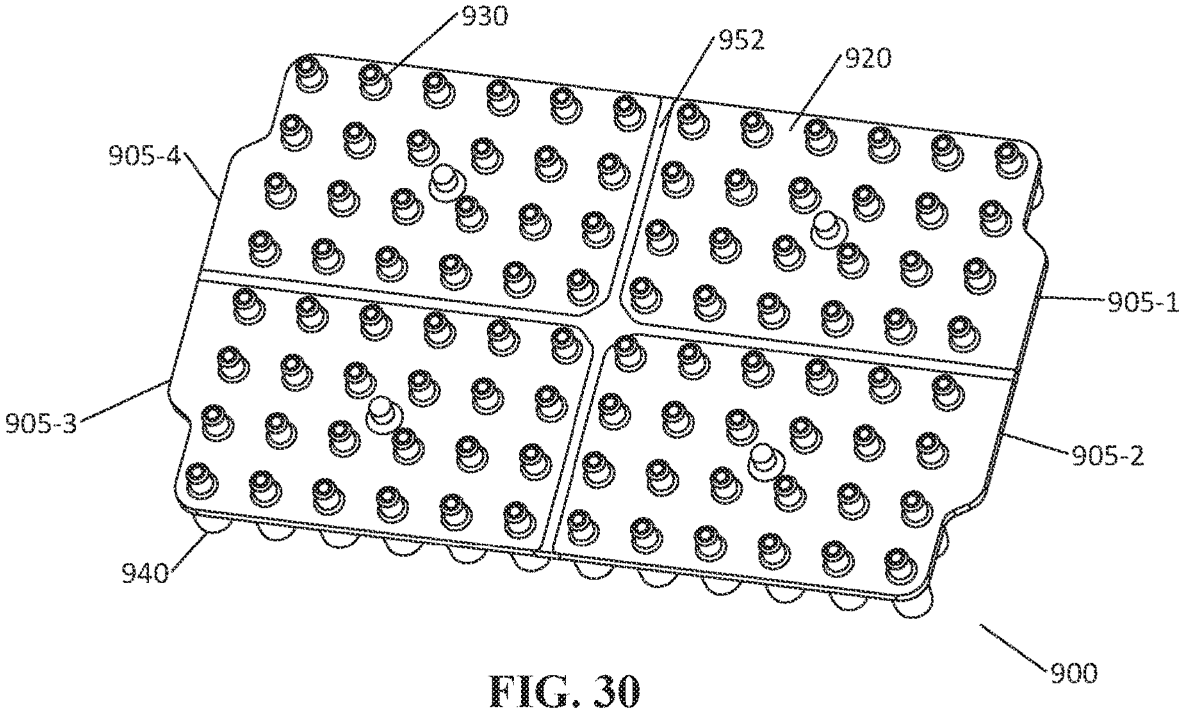
FIG. 30 is a top perspective view of pipette tip adapter embodiment 900.
Figure 31:
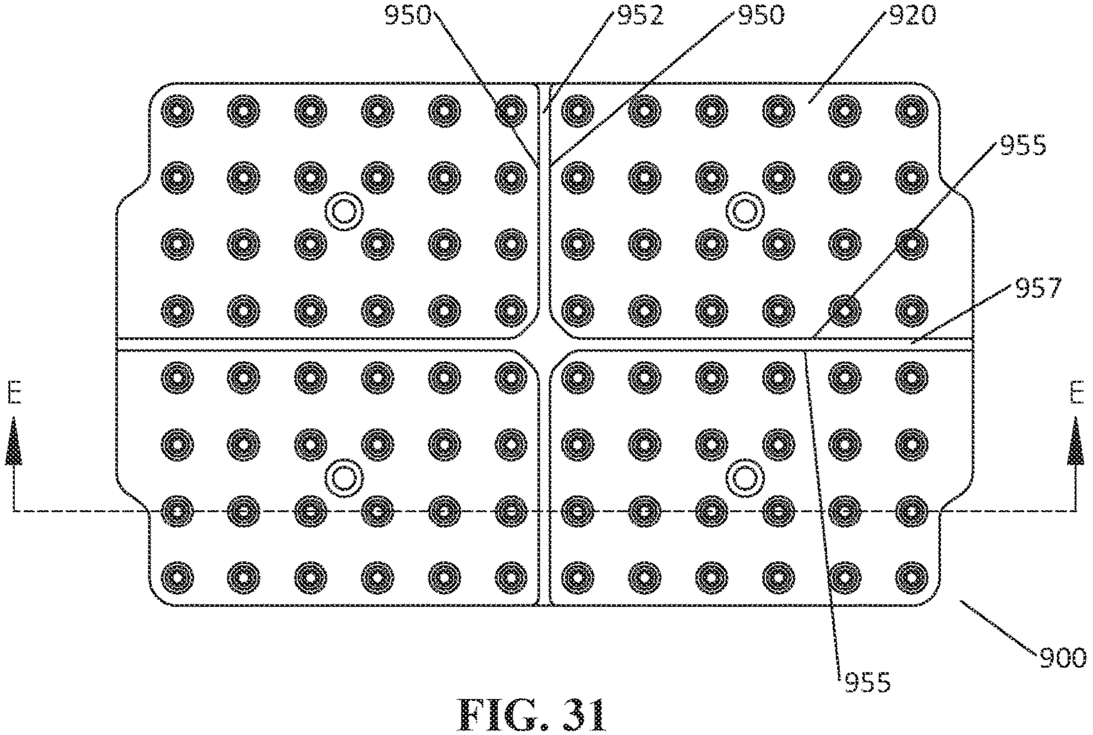
FIG. 31 is a top view thereof, which shows cutting plane E-E.
Figure 32:
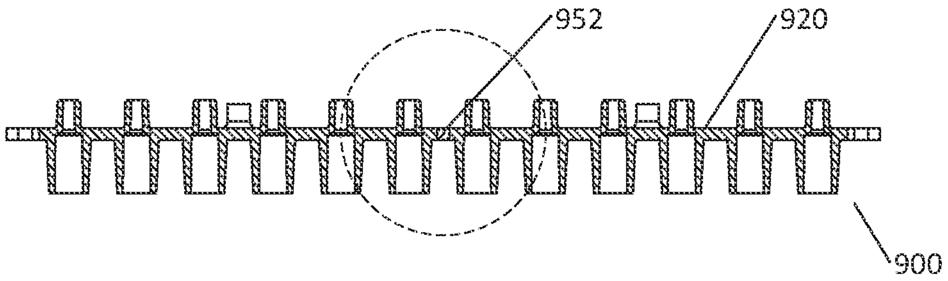
FIG. 32 is a section view thereof through cutting plane E-E shown in FIG. 31, which shows a region delineated by a broken line circle.
Figure 33:
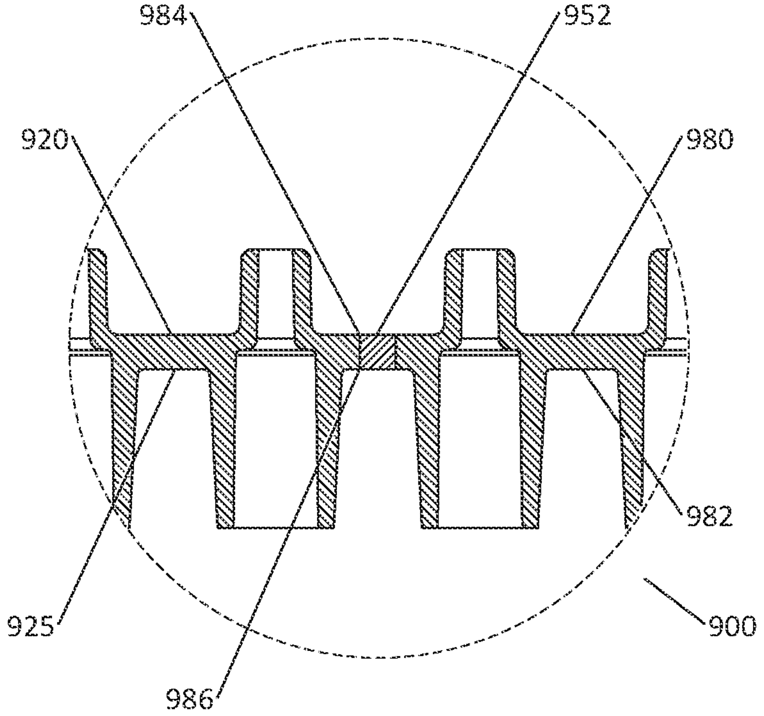
FIG. 33 is an enlarged view of the region delineated by the broken line circle present in FIG. 32.
Figure 34:
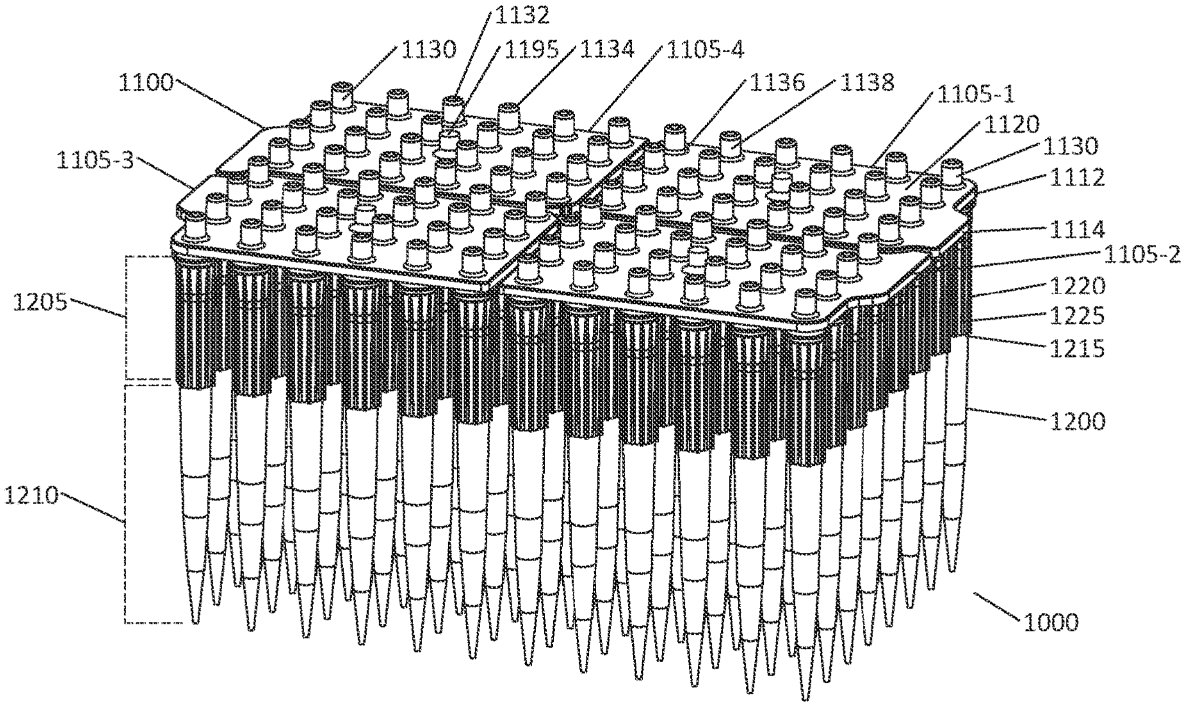
FIG. 34 is a top perspective view of assembly embodiment 1000 that includes pipette tip adapter embodiment 1100 in association with an array of pipette tips.
Figure 35:
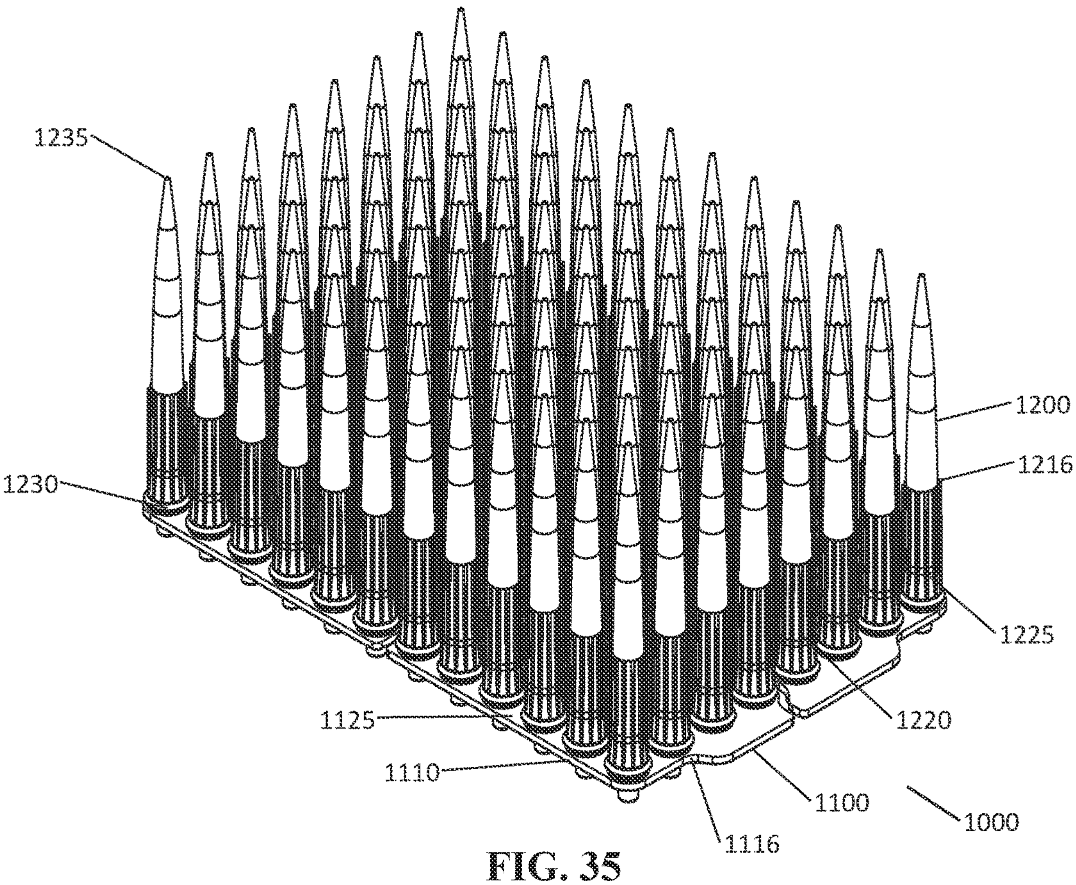
FIG. 35 is a bottom perspective view thereof.
Figure 36:
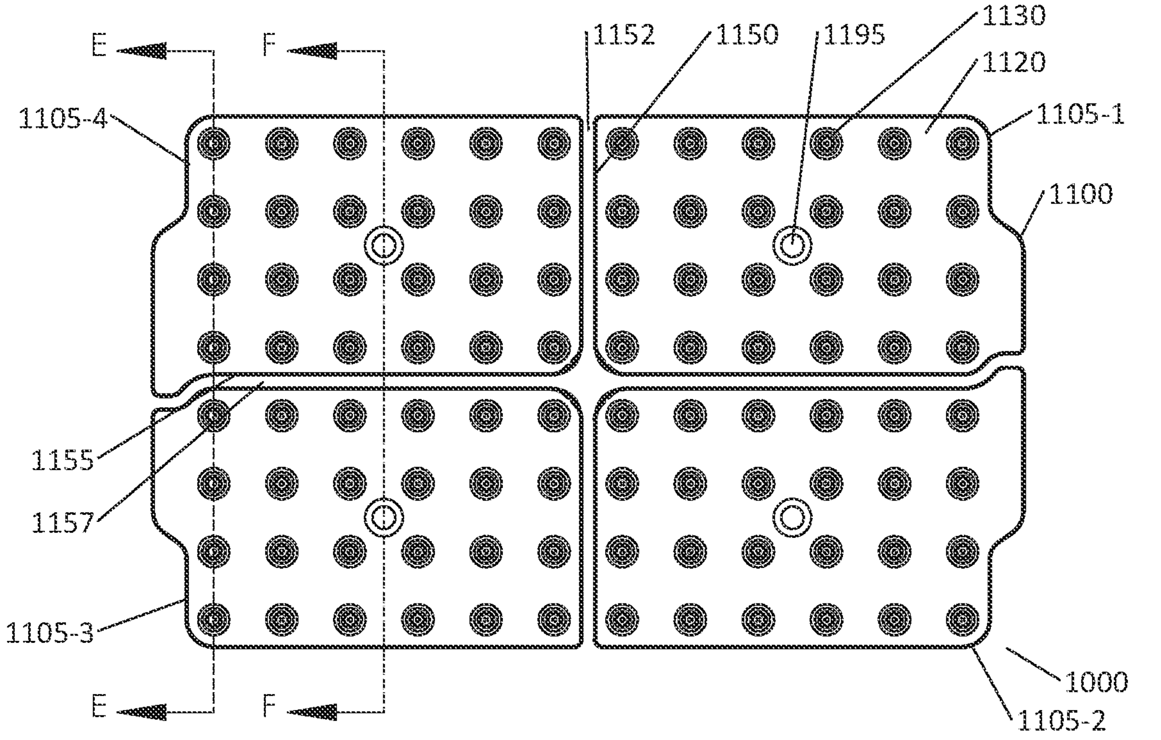
FIG. 36 is a top view thereof showing cutting planes E-E and F-F.
Figure 37:
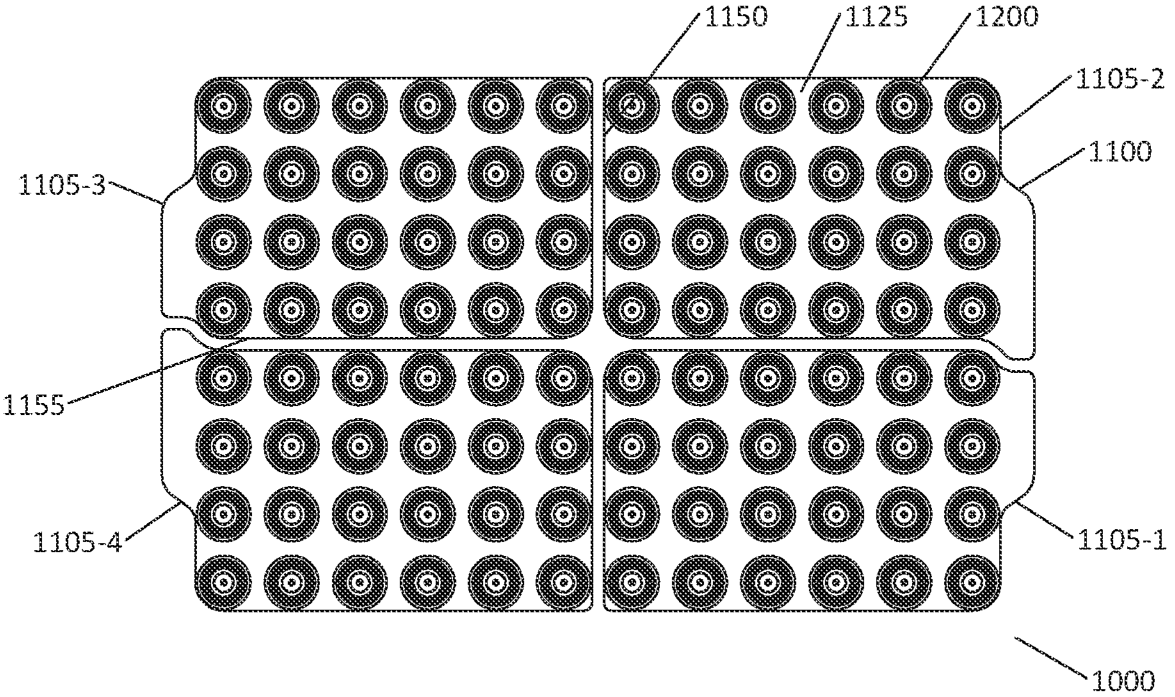
FIG. 37 is a bottom view thereof.
Figure 38:
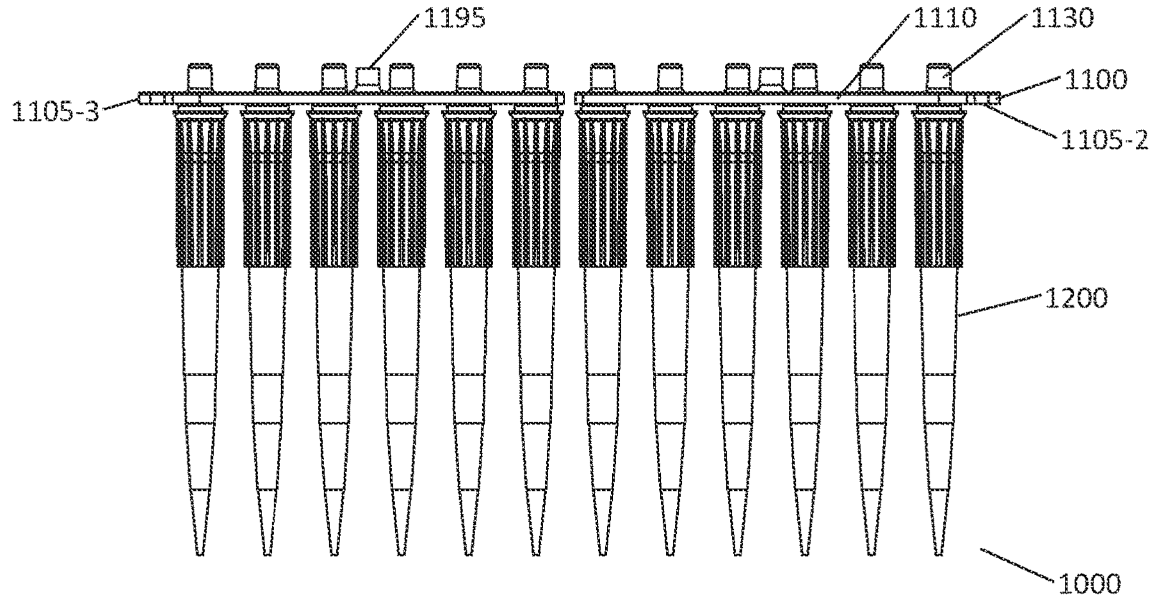
FIG. 38 is a front view thereof.
Figure 39:
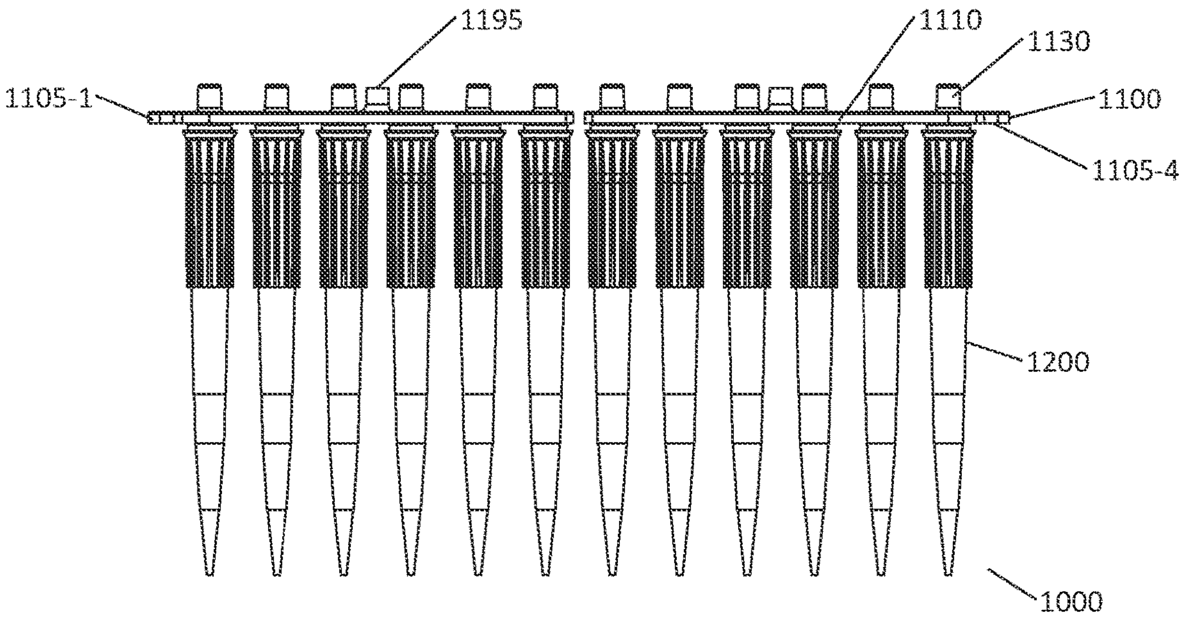
FIG. 39 is a back view thereof.
Figure 40:
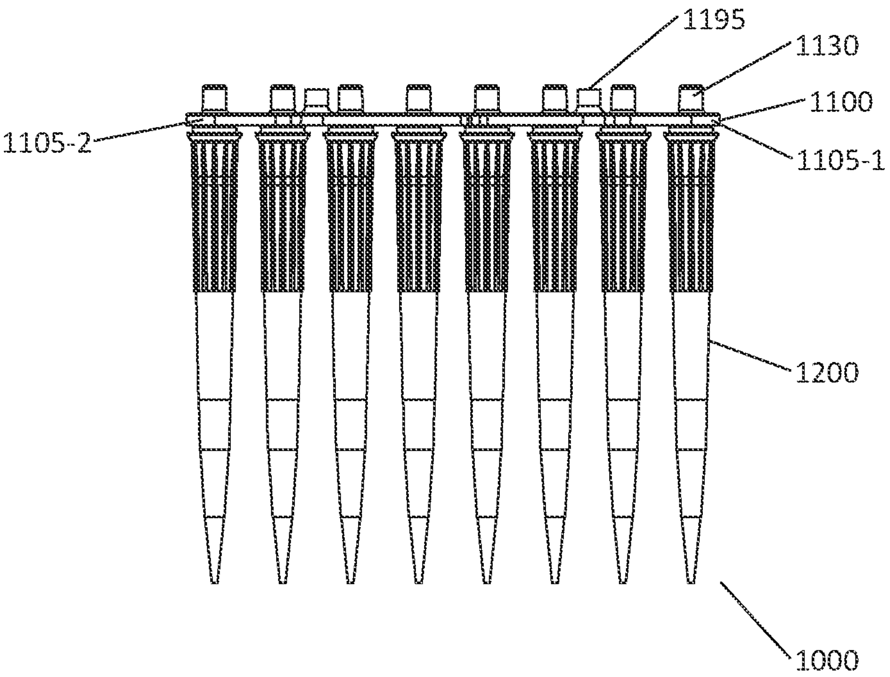
FIG. 40 is a side view thereof.
Figure 41:
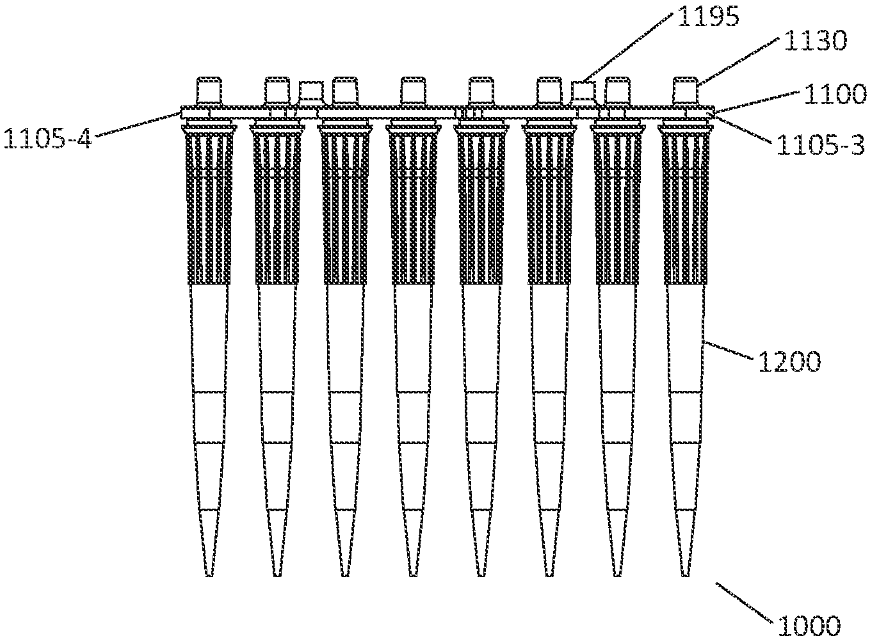
FIG. 41 is a side view thereof.
Figure 42:
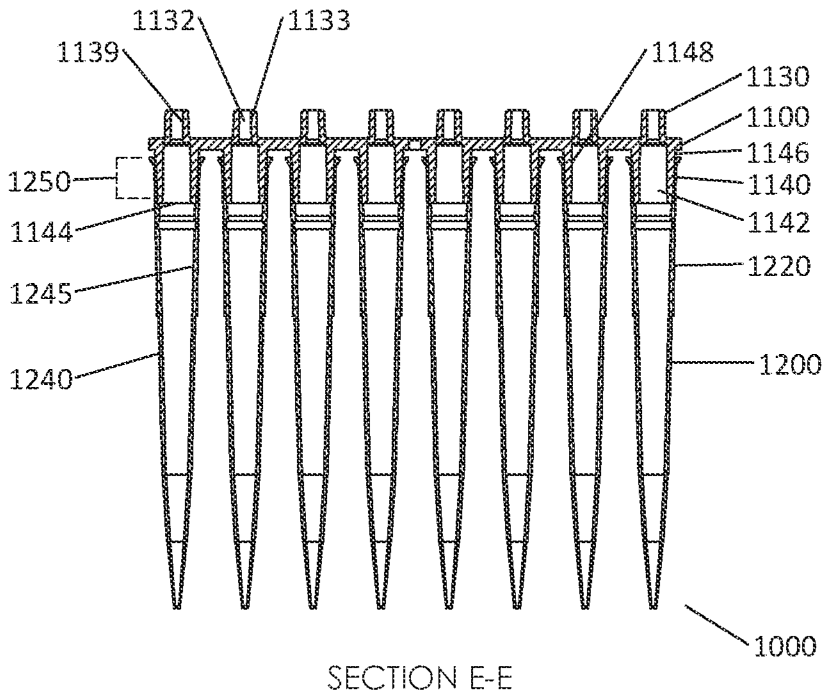
FIG. 42 is a section view thereof through cutting plane E-E shown in FIG. 36.
Figure 43:
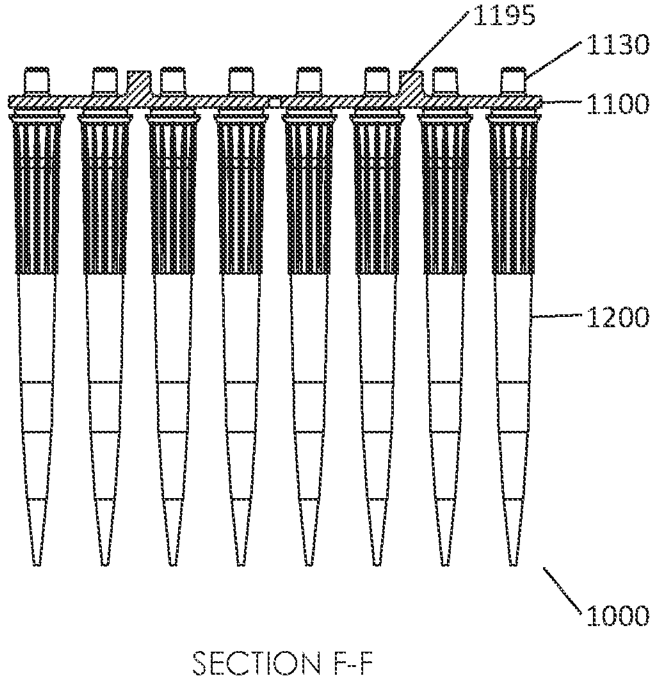
FIG. 43 is a section view thereof through cutting plane F-F shown in FIG. 36.
Figure 44:
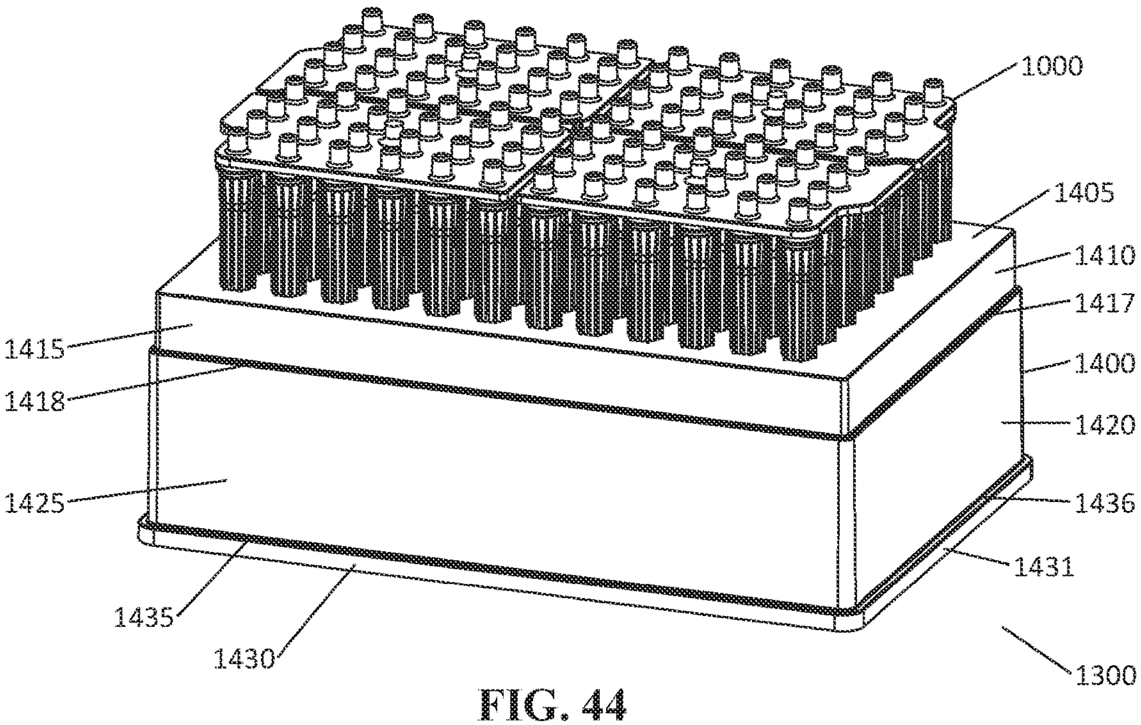
FIG. 44 is a top perspective view of assembly embodiment 1300 that includes an assembly embodiment 1000 in association with a pipette tip rack 1400.
Figure 45:
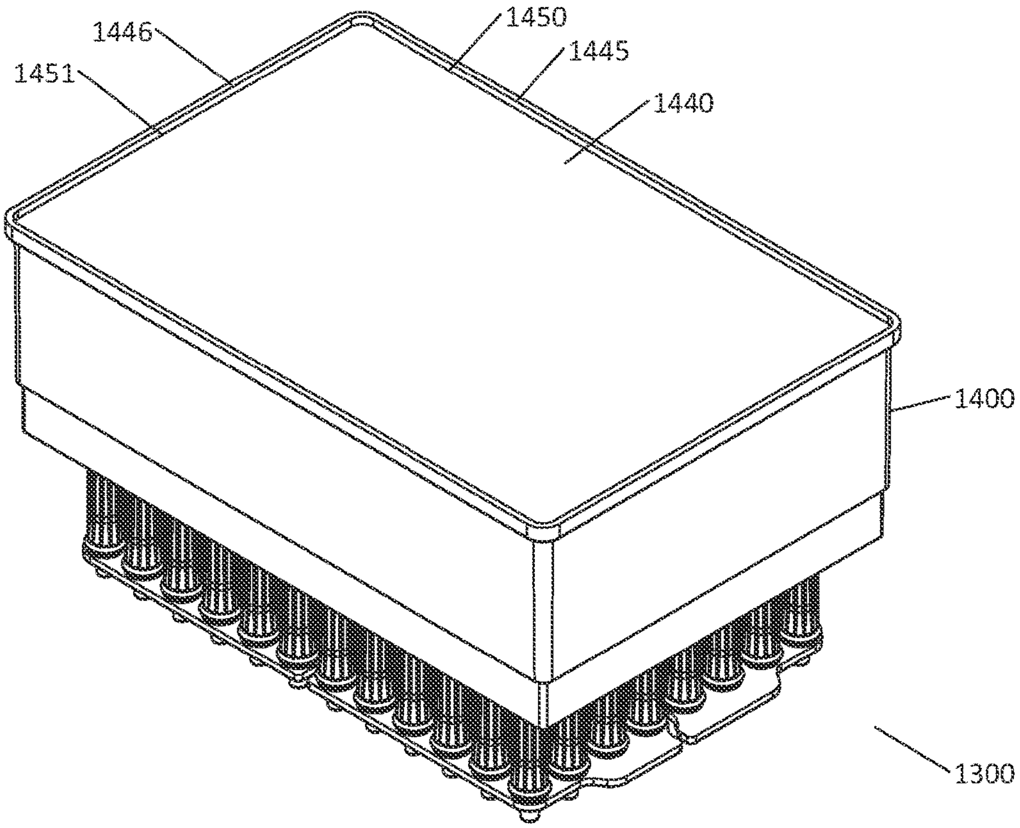
FIG. 45 is a bottom perspective view thereof.
Figure 46:
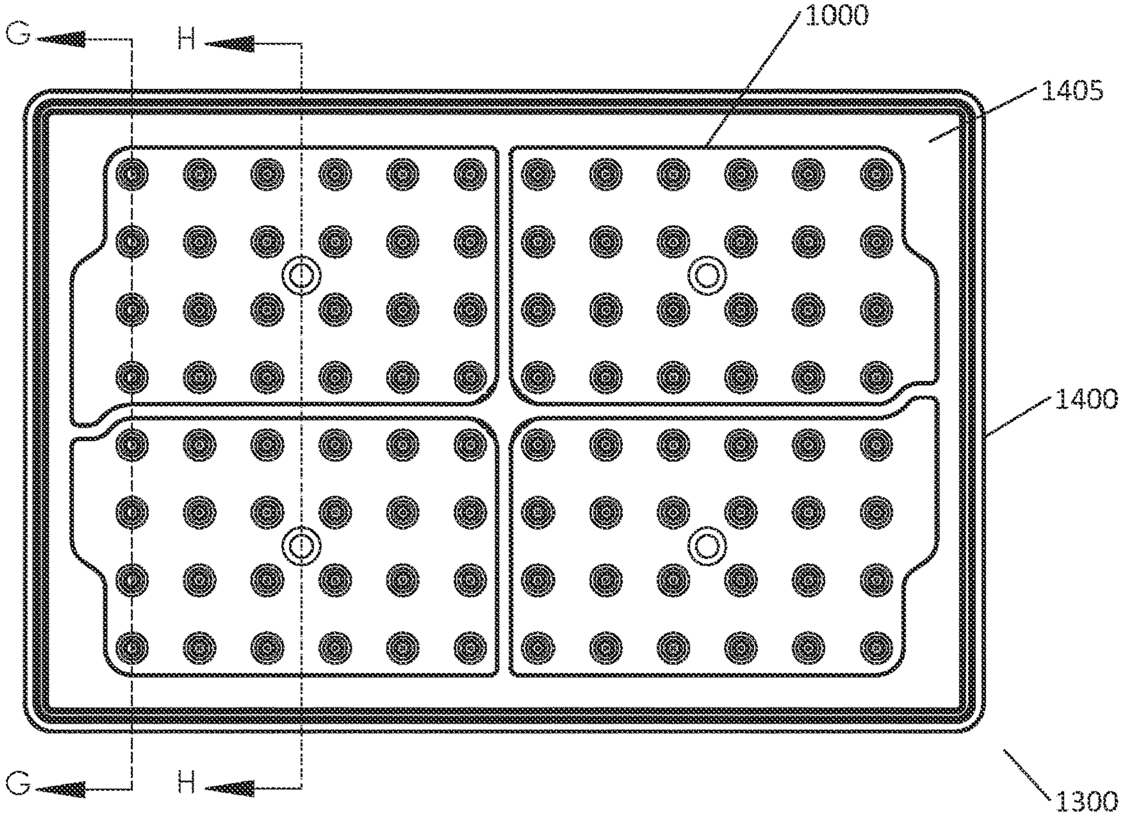
FIG. 46 is a top view thereof showing cutting planes G-G and H-H.
Figure 47:
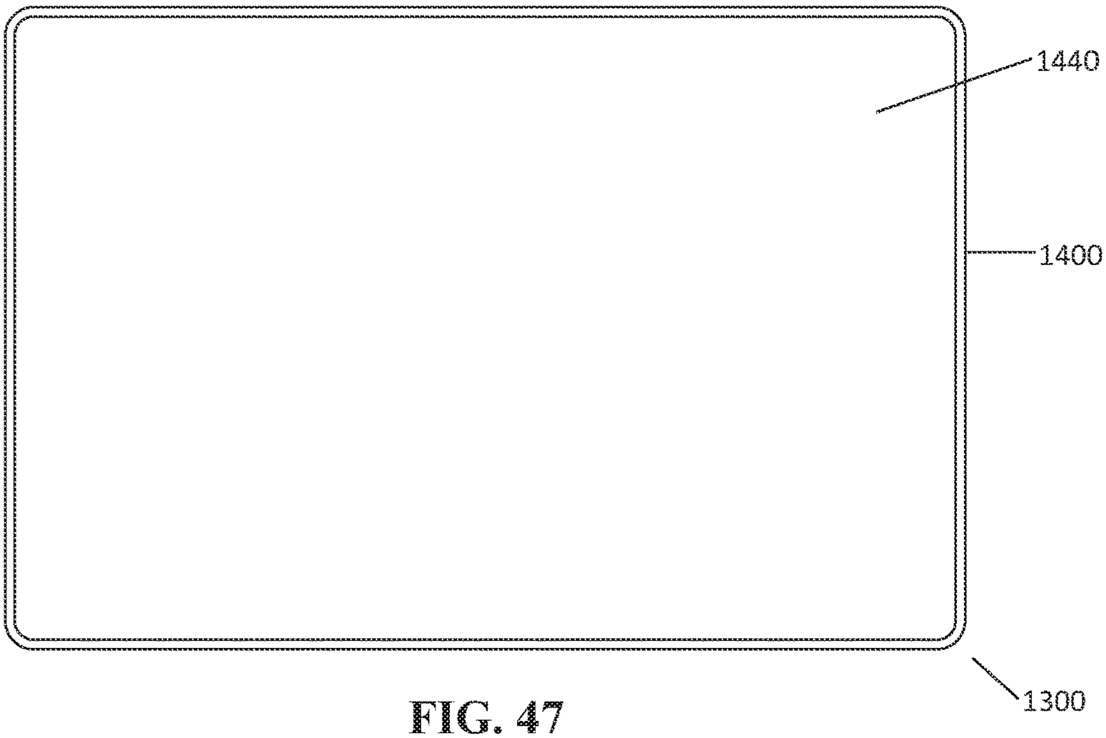
FIG. 47 is a bottom view thereof.
Figure 48:
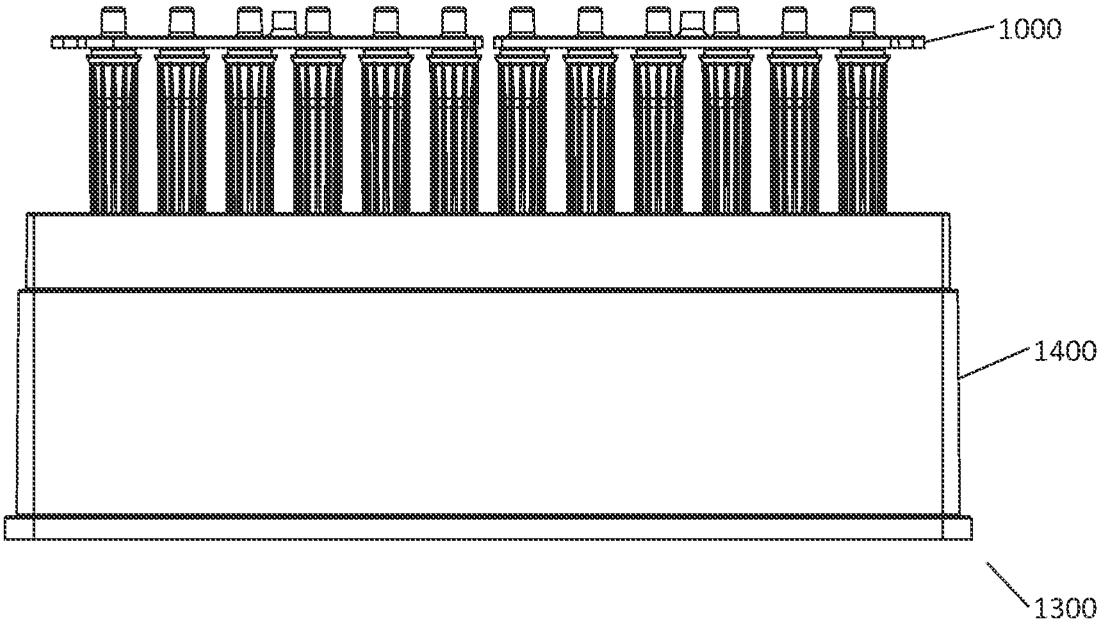
FIG. 48 is a front view thereof.
Figure 49:
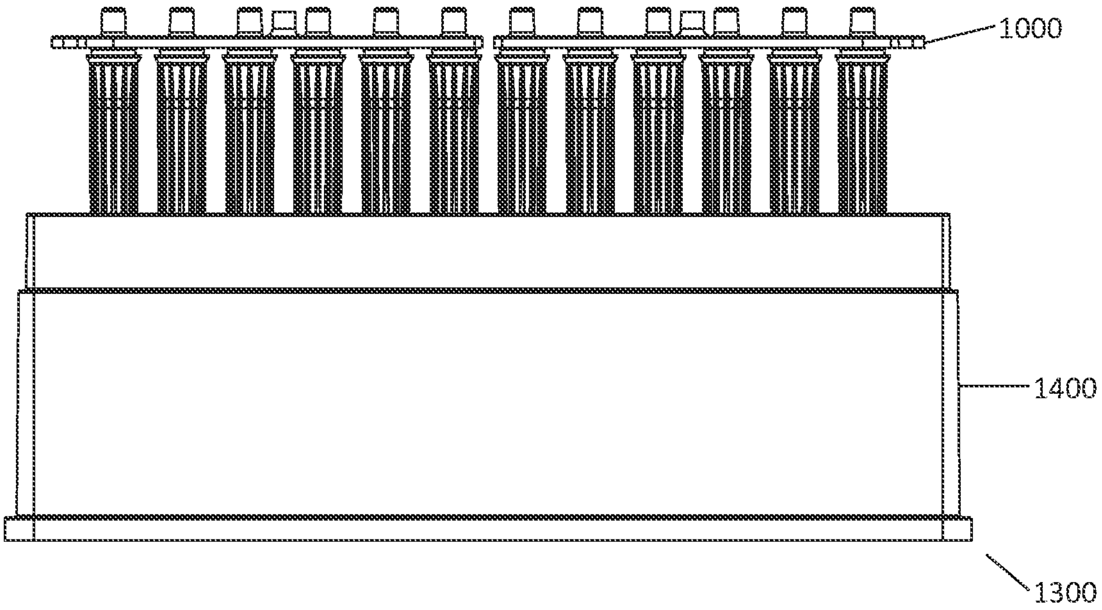
FIG. 49 is a back view thereof.
Figure 50:
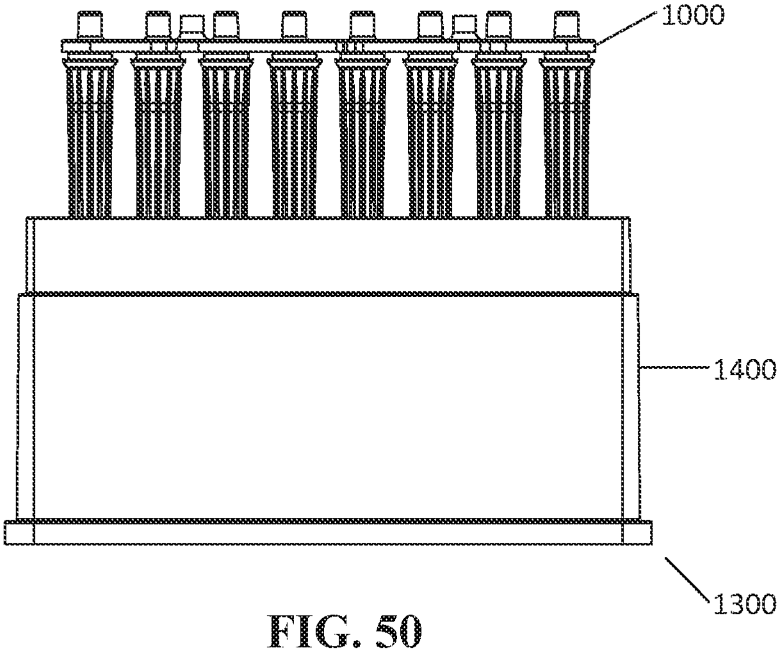
FIG. 50 is a side view thereof.
Figure 51:
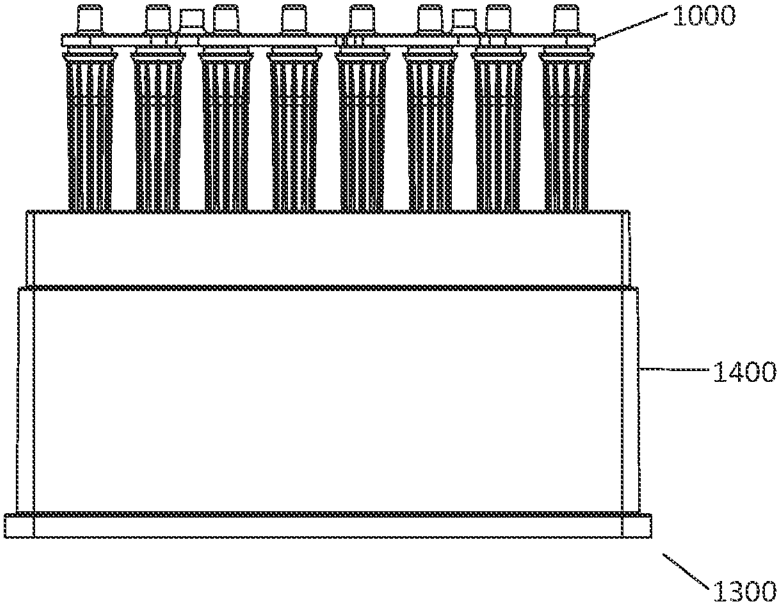
FIG. 51 is a side view thereof.
Figure 52:
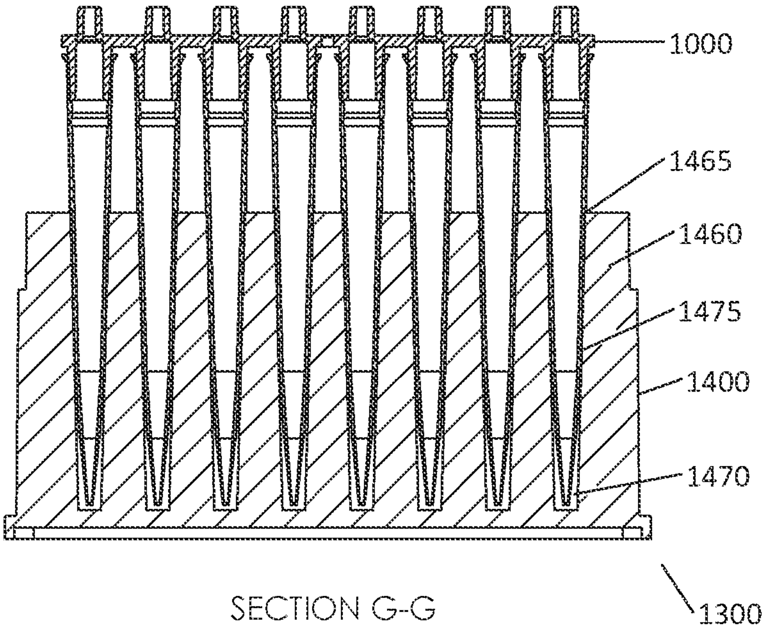
FIG. 52 is a section view thereof through cutting plane G-G shown in FIG. 46.
Figure 53:
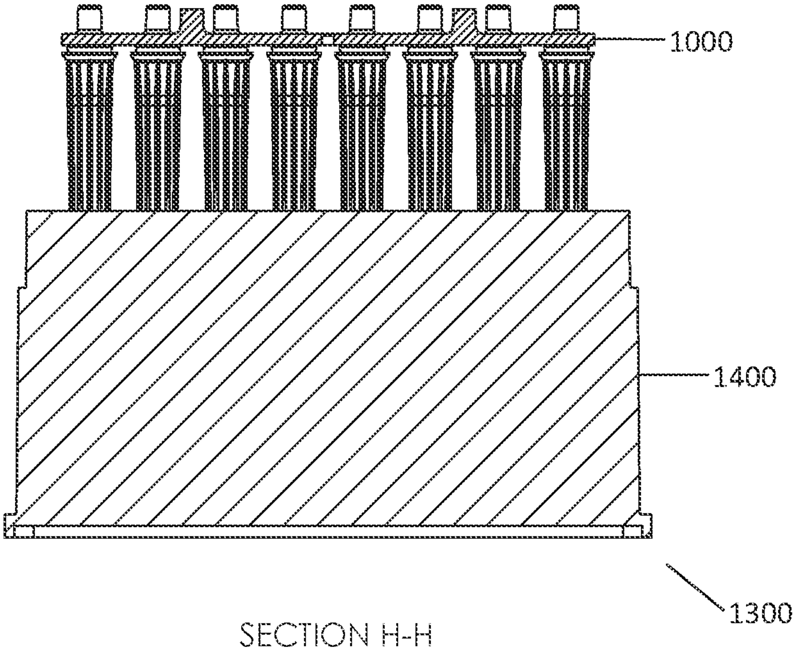
FIG. 53 is a section view thereof through cutting plane H-H shown in FIG. 36.

In another example, adapter embodiment 900 illustrated in FIG. 30 and FIG. 31 includes a generally continuous connector disposed at the junctions between adjacent plate segments. The generally continuous connector is disposed within segment interior edge 950 and 955 and within the junction regions 952 and 957 between segment interior edges. The generally continuous connector is contiguous with the plate segment proximal boundary 980, plate distal boundary 982, junction proximal boundary 984 and junction distal boundary 986. The generally continuous connector typically is flexible (e.g., the connector permits at least one plate segment to translate out of plane with respect to an adjacent plate segment, and permits at least one plate segment to be disposed in the same plane as an adjacent plate segment). The generally continuous connector may be manufactured from a material that includes or consists of an elastomer (non-limiting examples of provided herein). Adapter 900 sometimes is a two-shot product, with the plate segments manufactured from one material (e.g., polypropylene) and the connector separately manufactured from another material (e.g., a material relatively more elastic or flexible than the material from which the plate segments are manufactured). In some embodiments, the generally continuous connector and the plate segments are manufactured as a unitary product from the same material. In certain embodiments, the generally continuous connector is instead discontinuous at one or more adjacent plate segments. In some embodiments, the generally continuous connector has a thickness less than the thickness of each plate segment (i.e., the proximal surface of the connector is not contiguous with plate segment proximal boundary 980, and/or the distal surface of the connector is not contiguous with the plate distal boundary 982). In some embodiments the generally continuous connector is removed.

Adapter embodiment 100 includes a gate projection 195 on each plate segment that remains after molding. Other adapter embodiments may include a gate projection having a different geometry (e.g., extending a different distance from the proximal surface of the plate segment; having a wider or narrower diameter), may include a gate projection disposed in a different location (e.g., extending from a different location on the proximal surface of the plate segment; extending from the distal surface of the plate segment), and/or may include no gate projections.

Segmented Adapter Assemblies

Provided in certain embodiments is an assembly referred to herein as a "cartridge assembly" that includes a segmented pipette tip adapter and an array of pipette tips, where each of the pipette tips in the array of pipette tips is associated with a tubular projection of the adapter. In some embodiments, an exterior surface of each tubular projection contacts an interior surface of a joined pipette tip, and in certain embodiments an interior surface of each tubular projection contacts an exterior surface of a joined pipette tip. Each of the pipette tips often is in sealing engagement with a tubular projection of the adapter, and pipette tips sometimes are retained by the tubular projections of the adapter by an interference fit (e.g., hoop-stretching of the pipette tip wall around the exterior surface of the tubular projection). A cartridge assembly can include any suitable number of pipette tips. An array of pipette tips in association with a segmented pipette tip adapter sometimes includes 96 pipette tips, 384 pipette tips or 1536 pipette tips. Segmented pipette tip adapters shown in the drawings herein are configured to associate with an array of pipette tips having 96 pipette tips. Any suitable pipette tip can be utilized, including without limitation, pipette tips described at the Hypertext Transfer Protocol Secure (https) address biotix.com/products/xtip4-for-Its-pipettes.

A non-limiting example of a cartridge assembly is illustrated in FIG. 14 to FIG. 23. Cartridge assembly 200 includes segmented pipette tip adapter embodiment 100 and an array of pipette tips, where each pipette tip 300 in the array of pipette tips is sealingly and releasably joined to a corresponding tubular projection 140 in adapter 100. Each pipette tip 300 includes pipette tip proximal region 305, pipette tip distal region 310, a junction 315 between the pipette tip proximal region and pipette tip distal region, a pipette tip sidewall exterior surface 340, a pipette tip sidewall interior surface 345, and a sealing region 350 between each pipette tip 300 and each corresponding tubular projection 140 disposed in the pipette tip proximal region. Each pipette tip 300 illustrated includes a pipette tip collar 316 at junction 315, a pipette tip rib 320 in a plurality of ribs, a pipette tip sidewall 325 between adjacent ribs and a pipette tip proximal flange 330, each of which are optional features.

Provided in some embodiments is an assembly referred to as a "fluid dispensing assembly" that includes a cartridge assembly described in the preceding paragraph in connection with a fluid dispensing device. In some embodiments, an exterior surface of each nozzle contacts an interior surface of pipettor member, and in certain embodiments an interior surface of each nozzle contacts an exterior surface of a pipettor member. Each of the nozzles often is in sealing engagement with a pipettor member, and nozzles sometimes are retained by a pipettor member by an interference fit. Any suitable pipettor can be utilized, including without limitation a fluid dispensing device described in PCT application publication no. WO2016/081595A1, published on May 26, 2016, having application no. PCT/US2015/061329, filed on Nov. 18, 2015, and entitled "Multichannel Air Displacement Pipettor."

Figure 13:
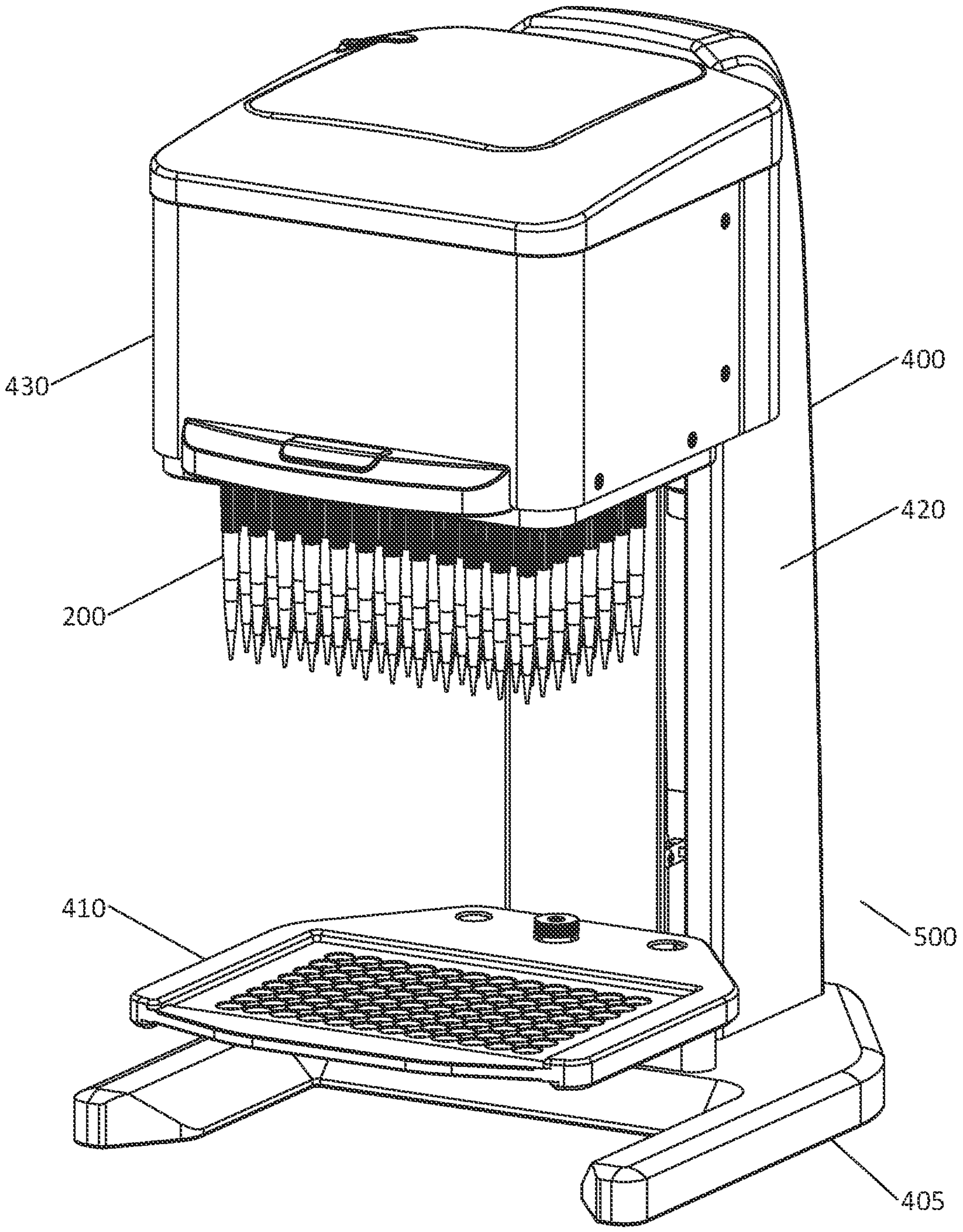
FIG. 13 is a top perspective view of assembly embodiment 500 that includes fluid dispensing device embodiment 400 in connection with assembly embodiment 200 illustrated in FIG. 14 to FIG. 23.
Figure 14:
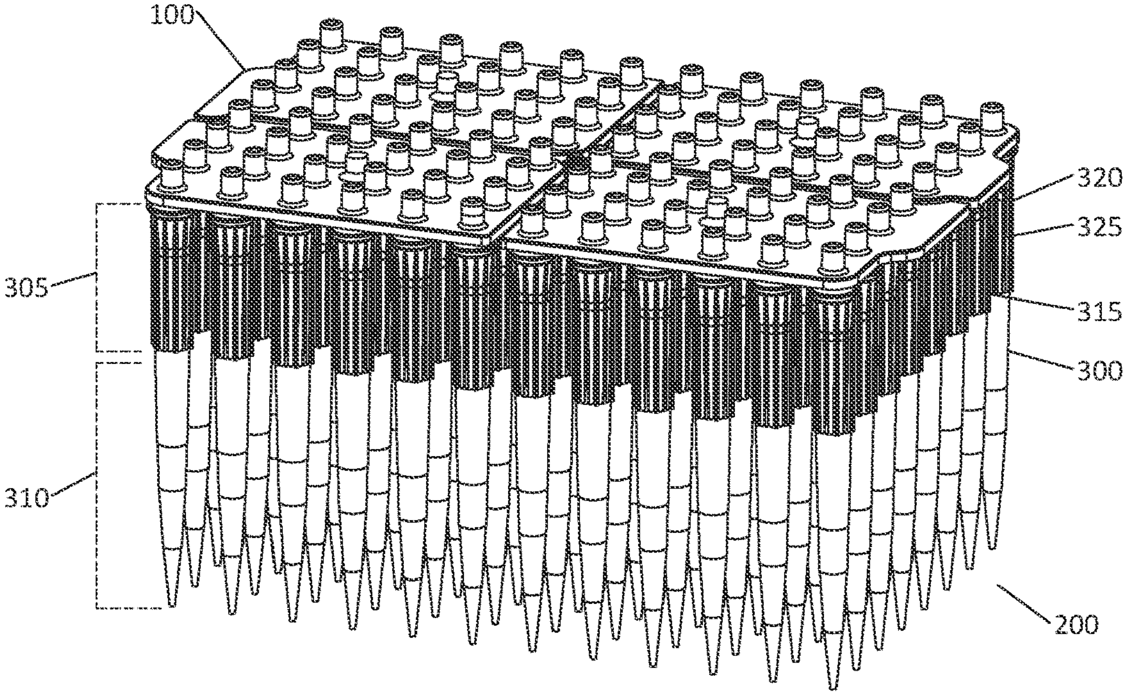
FIG. 14 is a top perspective view of assembly embodiment 200 that includes pipette tip adapter embodiment 100 in association with an array of pipette tips.
Figure 15:
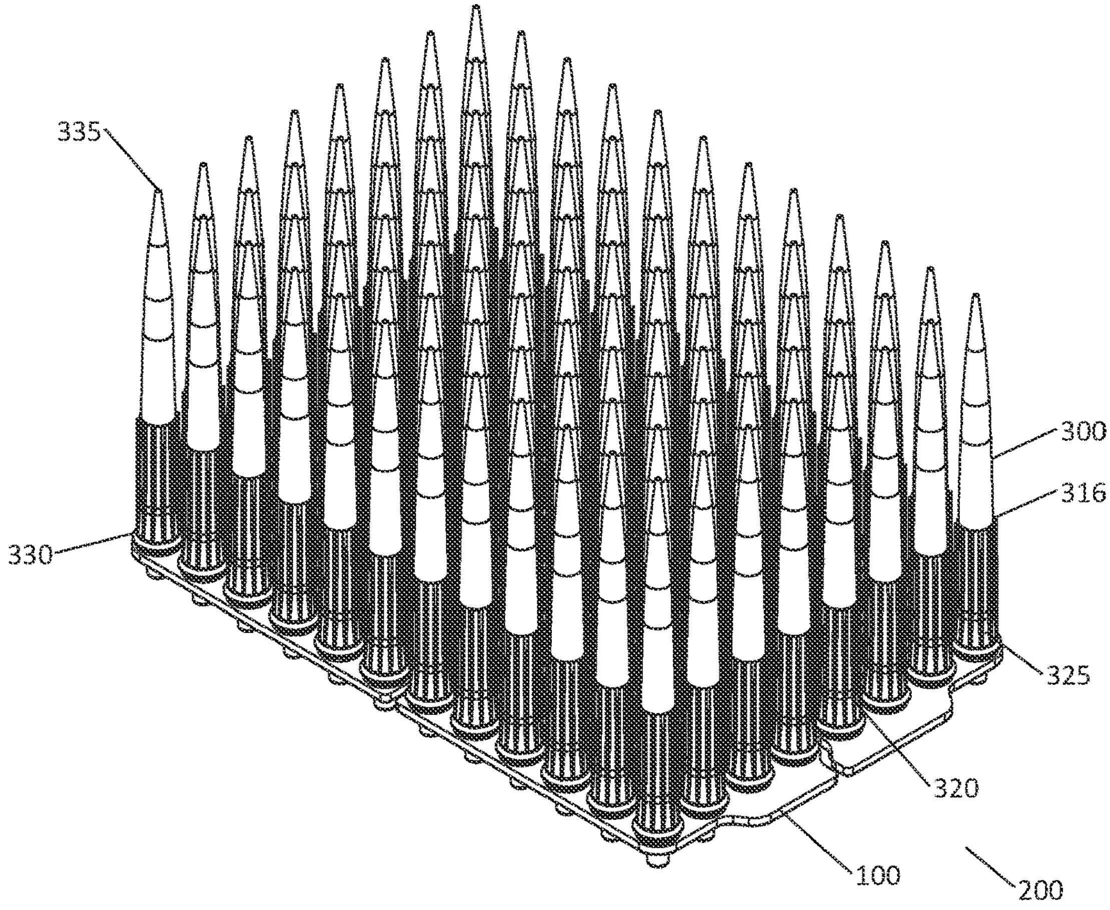
FIG. 15 is a bottom perspective view thereof.
Figure 16:
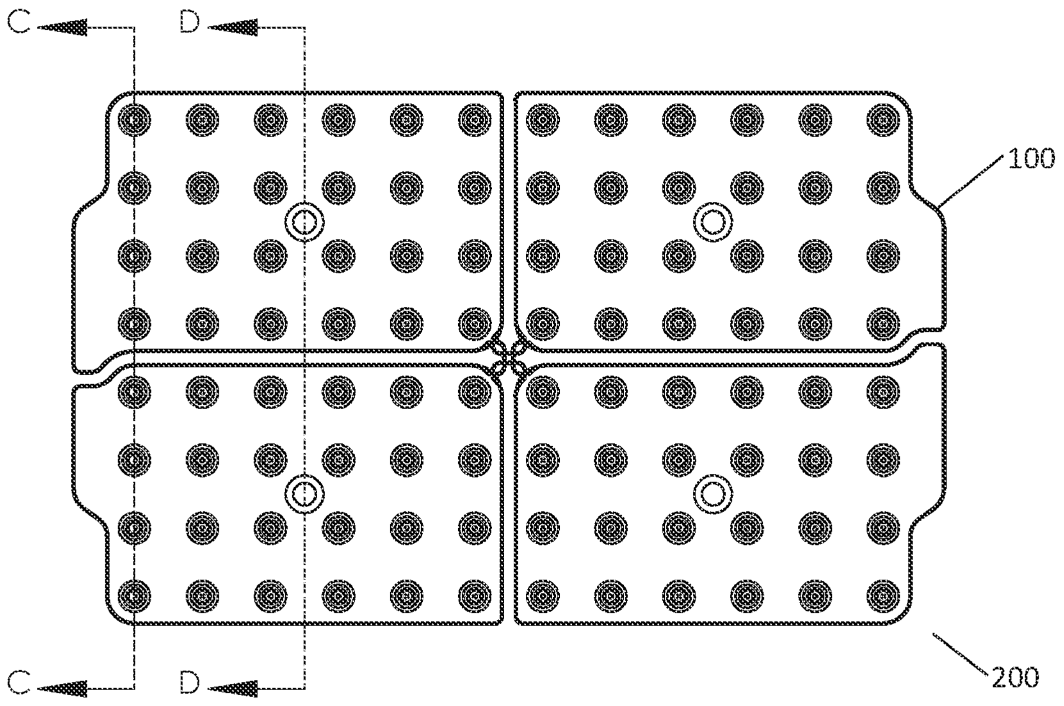
FIG. 16 is a top view thereof showing cutting planes C-C and D-D.
Figure 17:
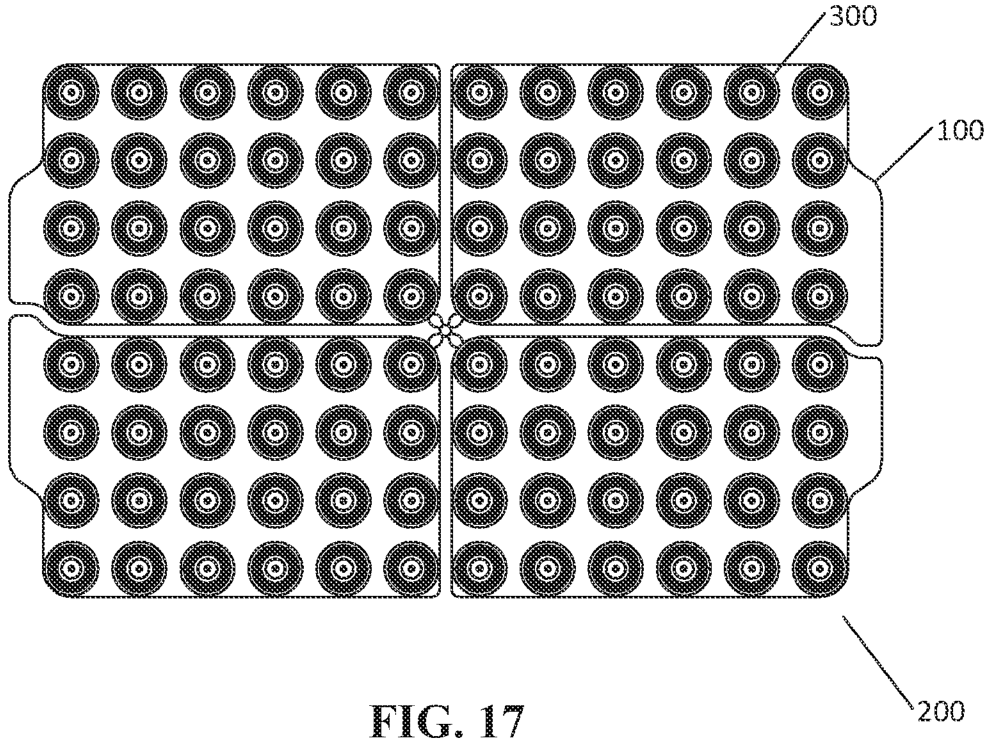
FIG. 17 is a bottom view thereof.
Figure 18:
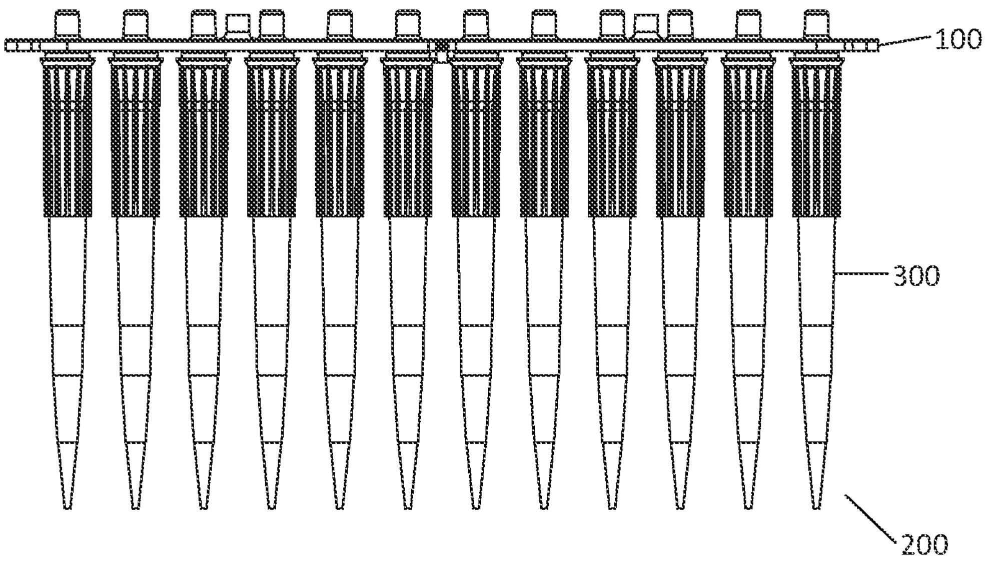
FIG. 18 is a front view thereof.
Figure 19:
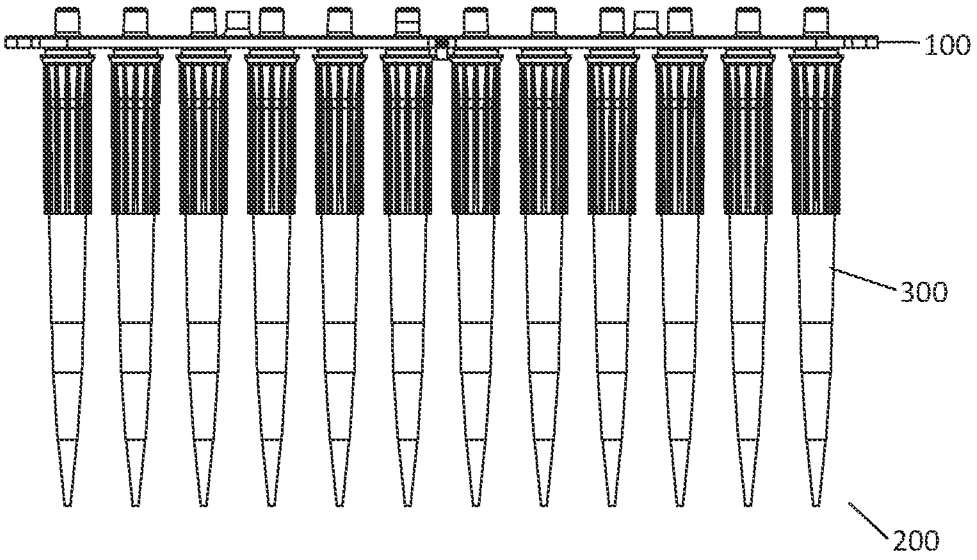
FIG. 19 is a back view thereof.
Figure 20:
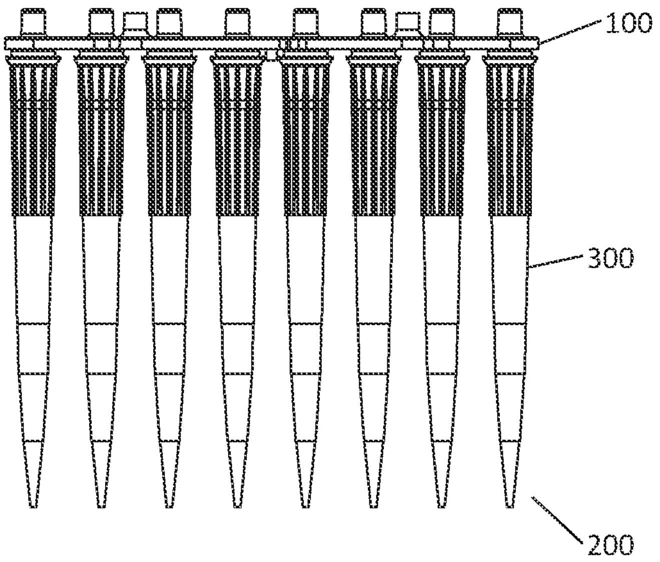
FIG. 20 is a side view thereof.
Figure 21:
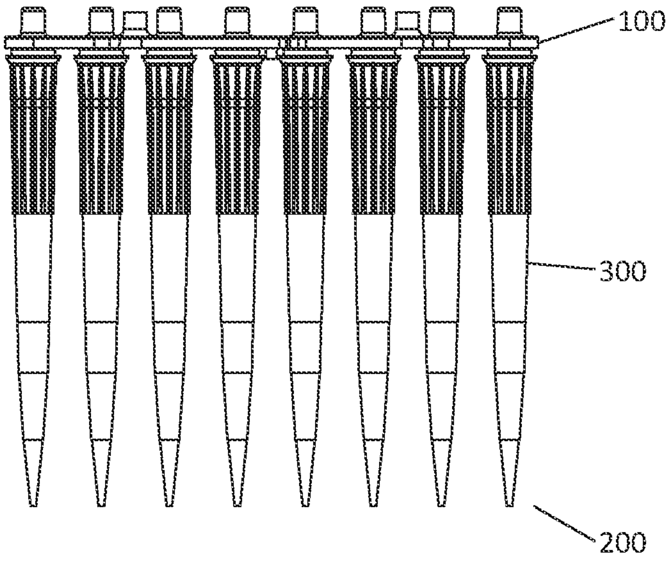
FIG. 21 is a side view thereof.
Figure 22:
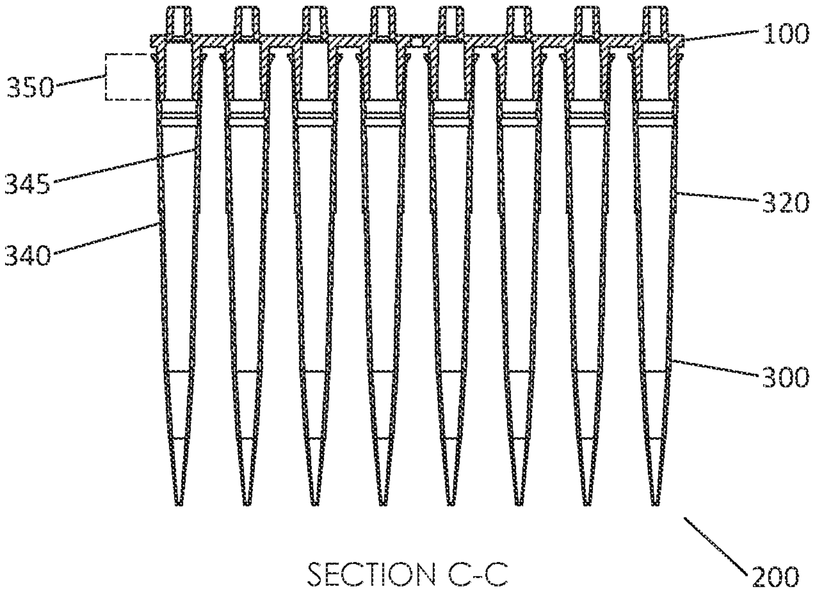
FIG. 22 is a section view thereof through cutting plane C-C shown in FIG. 16.
Figure 23:
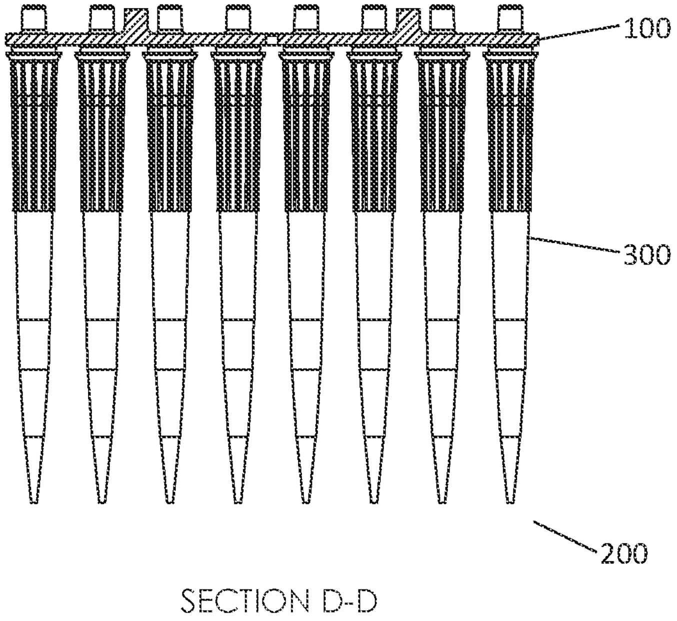
FIG. 23 is a section view thereof through cutting plane D-D shown in FIG. 16.
Figure 24:
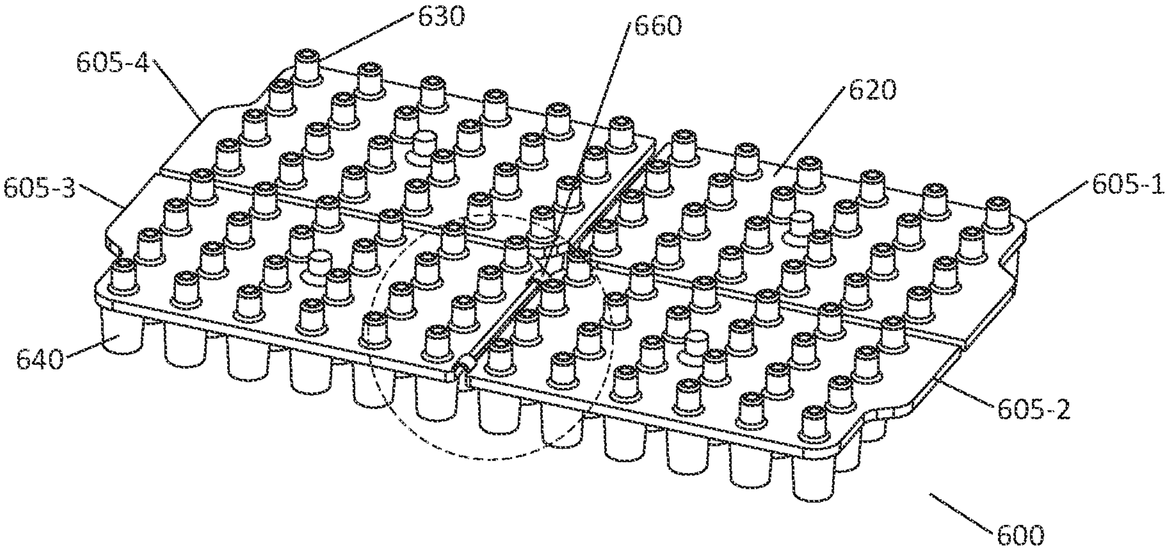
FIG. 24 is a top perspective view of pipette tip adapter embodiment 600, which shows a region delineated by a broken line circle.
Figure 25:
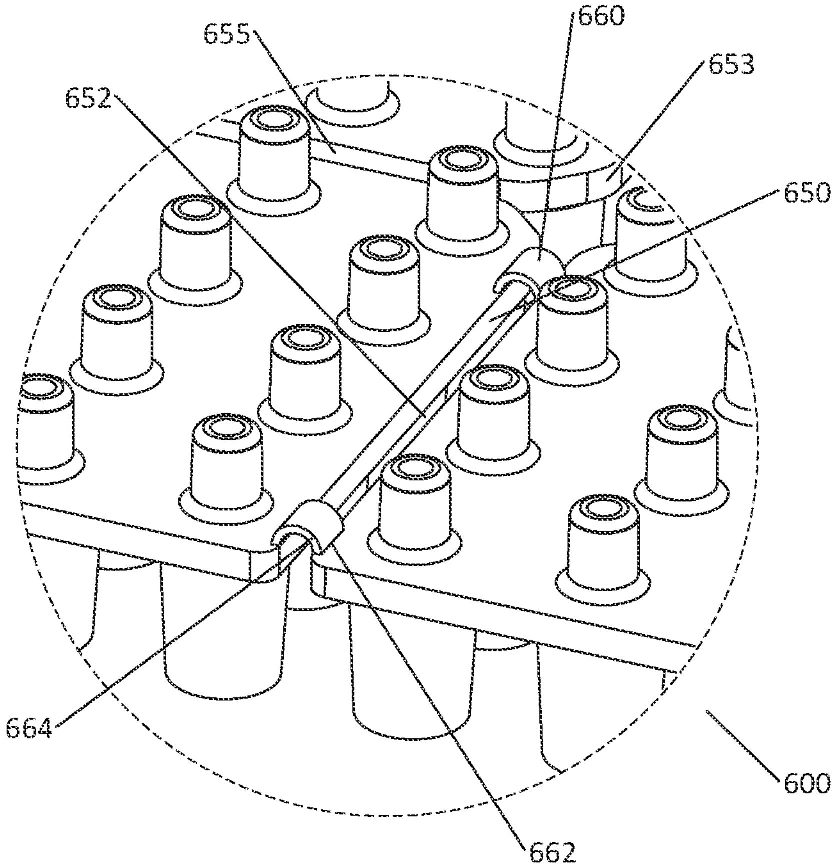
FIG. 25 is an enlarged view of the region delineated by the broken line circle present in FIG. 24.

A non-limiting example of a fluid dispensing assembly is illustrated in FIG. 13. Fluid dispensing assembly 500 includes pipettor 400 joined to cartridge assembly 200. Pipettor 400 includes a pipettor base 405, pipettor platform 410, pipettor arm 420 and pipettor head 430. Each nozzle 130 in cartridge assembly 200 is configured to sealingly and reversibly join with a corresponding receiving member in head 430. The pipette tips of the cartridge assembly are in air-displacement communication with the pipettor after the cartridge assembly is joined to the pipettor.

A segmented pipette tip adapter sometimes is frangible, and sometimes plate segments are dissociated in a segmented pipette tip adapter in a cartridge assembly. Dissociating plate segments in a segmented pipette tip adapter sometimes includes breaking and/or removing connectors of the segmented pipette tip adapter, and/or breaking and/or removing joints present at junctions, as applicable, prior to, or after, associating tubular projections of the plate segments with an array of pipette tips.

A non-limiting example of a frangible segmented pipette tip adapter assembly, in which plate segments of the adapter have been disassociated, is illustrated as assembly 1000 in FIG. 34 to FIG. 43. In certain embodiments, one or more connectors that exist between plate segments can be removed and/or broken before, during or after tubular projections of the adapter are associated with the array of pipette tips, as part of providing assembly 1000. Cartridge assembly 1000 includes adapter 1100 that contains multiple disassociated plate segments (1105-1, 1105-2, 1105-3, 1105-

4). Plate segments include a segment peripheral edges (1110, 1112, 1114), segment peripheral edge transition 1116, a plate proximal surface (upper surface) 1120, and a plate distal surface (lower surface) 1125. Adapter 1100 also includes an array of nozzles joined to and extending from the proximal surface of the plate, in which each nozzle 1130 includes a nozzle bore 1132, a nozzle proximal surface 1133, a nozzle chamfer 1134, a nozzle flange 1136, a nozzle sidewall exterior surface 1138 and a nozzle sidewall interior surface 1139. Adapter 1100 also includes an array of tubular projections joined to and extending from the distal surface of the plate, in which each tubular projection 1140 includes tubular projection bore 1142, tubular projection distal surface 1144, tubular projection sidewall exterior surface 1146, and tubular projection sidewall interior surface 1148. In adapter 1100, each nozzle 1130 is concentric with a corresponding tubular projection 1140, and there exists a transition between each nozzle bore and the corresponding tubular projection bore 1149. Each segment (1105-1, 1105-2, 1105-3, 1105-4) includes a segment interior edge (e.g., 1150, 1155) and a junction region between the segment interior edges (e.g., 1152, 1157). Assembly 1000 includes an array of pipette tips in which each pipette tip 1200 includes a pipette tip proximal region 1205, a pipette tip distal region 1210, a junction between the pipette tip proximal region and pipette tip distal region 1215, pipette tip sidewall exterior surface 1240, pipette tip sidewall interior surface 1245, and a sealing region 1250 between each pipette tip 1200 and each corresponding tubular projection 1140 of the adapter. Sometimes a pipette tip includes a pipette tip collar 1216 at junction 1215, and sometimes a pipette tip includes a plurality of ribs (pipette tip rib 1220) and a pipette tip sidewall 1225 between ribs. A pipette tip sometimes includes a pipette tip proximal flange 1230.

Another non-limiting example of a frangible segmented pipette tip adapter assembly is illustrated as assembly 1300 in FIG. 44 to FIG. 53. In some embodiments, one or more connectors between plate segments can be removed and/or broken before, during or after tubular projections of the adapter are associated with the array of pipette tips, as part of providing assembly 1300. In certain embodiments, one or more connectors between plate segments can be removed and/or broken before, during or after the assembly containing the adapter joined to the array of pipette tips (e.g., assembly 200) is associated with the rack, as part of providing assembly 1300. Rack assembly embodiment 1300 includes rack 1400 having a receptacle plate that includes an array of bores, where each bore is configured to receive a corresponding pipette tip in an array of pipette tips included in assembly 1000. In certain embodiments, a shoulder of each pipette tip in the array of pipette tips, disposed at the junction between the proximal region of the pipette tip and the distal region of the pipette tip, is in contact with (e.g., rests on) the proximal surface of the rack (i.e., the top surface of the rack). In certain embodiments, rack 1400 includes a rack top surface 1405, a rack proximal side surface 1410, a rack proximal side surface 1415, a rack distal side surface 1420, a rack distal side surface 1425, a rack transition 1417 from proximal side surface 1410 to distal side surface 1420, and rack transition 1418 from proximal side surface 1415 to distal side surface 1425. In some embodiments, rack 1400 includes a rack flange side surface 1430, rack flange side surface 1431, a rack flange distal surface 1445, a rack flange distal surface 1445, a transition 1435 between rack distal side surface 1425 and rack flange surface 1430, and a transition 1436 between rack distal side surface 1420 and rack flange surface 1431. In certain embodiments, a rack includes a rack bottom surface 1440, a rack flange rear surface 1450, and a rack flange rear surface 1451. A rack sometimes includes a rack body 1460, a bore opening 1465, a bore 1470 and a bore sidewall 1475. A rack sometimes generally is hollow, and includes a pipette tip receptacle plate that includes an array of bores configured to receive an array of pipette tips.

Manufacturing Processes

A segmented pipette tip adapter described herein can be manufactured by any suitable process. A segmented pipette tip adapter sometimes is molded. Any suitable molding process can be utilized, non-limiting examples of which include injection molding, thermoforming (e.g., vacuum molding), blow molding, compression molding, extrusion molding, laminating, reaction injection molding, matrix molding, rotational molding (or rotomolding), spin casting and transfer molding. In some embodiments, a manufacturing process includes (a) providing a mold that includes structures configured to form the segmented pipette tip adapter; (b) introducing a moldable polymer to the mold; (c) curing the polymer in the mold, thereby producing the segmented pipette tip adapter; and (d) removing the segmented pipette tip adapter from the mold.

Thus, in some embodiments, provided is a mold configured to manufacture a segmented pipette tip adapter described herein. Also provided in some embodiments is a method for manufacturing a segmented pipette tip adapter, which includes contacting a mold configured to manufacture a segmented pipette tip adapter described herein with a moldable polymer, and ejecting the segmented pipette tip adapter from the mold after the polymer cures for a period of time.

In some embodiments, provided is a method for manufacturing a cartridge assembly, which includes joining pipette tips in an array of pipette tips to tubular projections of a segmented pipette tip adapter. Pipette tips sometimes are retained by the tubular projections of the adapter by an interference fit (e.g., hoop-stretching of the pipette tip wall around the exterior surface of the tubular projection). Also provided in certain embodiments, is a method for manufacturing a fluid dispensing assembly, which includes joining nozzles of a segmented pipette tip adapter in a cartridge assembly with a fluid dispensing device member. Provided also in certain embodiments is a method for manufacturing a rack assembly, which includes associating pipette tips of a segmented pipette tip adapter in a cartridge assembly with a corresponding bores in a rack. A segmented pipette tip adapter sometimes is frangible, and sometimes plate segments are dissociated in a segmented pipette tip adapter prior to, concurrently, or after (i) associating the tubular projections of the plate segments with an array of pipette tips, (ii) associating the nozzles of the plate segments with a fluid dispensing device member, or (iii) associating pipette tips of an adapter cartridge assembly with bores of a rack. Dissociating plate segments in a segmented pipette tip adapter sometimes includes breaking and/or removing connectors of the segmented pipette tip adapter, and/or breaking and/or removing joints present at junctions, as applicable.

Any suitable materials can be incorporated into a segmented adapter. An adapter or one or more adapter elements (e.g., plate segments, nozzles, tubular projections, connectors) sometimes include or consist of a polymer (e.g., moldable polymer). Non-limiting examples of polymers include low density polyethylene (LDPE), high-density polyethylene (HDPE), polypropylene (PP), polyester (PE), high impact polystyrene (HIPS), polyvinyl chloride (PVC), amorphous polyethylene terephthalate (APET), polycarbonate (PC) and the like.

One or more adapter elements (e.g., connectors) sometimes include or consist of an elastomer (e.g., moldable elastomer). Non-limiting examples of elastomers include styrenic block copolymers, polyolefin blends, elastomeric alloys, thermoplastic polyurethanes, thermoplastic copolyester and thermoplastic polyamides. Non-limiting examples of TPE products from the block copolymers group are STYROFLEX (BASF), KRATON (Shell Chemicals), PELLETHANE (Dow chemical), PEBAX, ARNITEL (DSM) and HYTREL (Du Pont). Non-limiting examples of commercially available elastomeric alloys include SANTOPRENE (in-situ cross linked polypropylene and EPDM rubber; Monsanto), GEOLAST (Monsanto) and ALCRYN (Du Pont). Other non-limiting examples of elastomers include thermoplastic vulcanizates (TPV; SANTOPRENE TPV), thermoplastic polyurethane (TPU), thermoplastic olefins (TPO), polysulfide rubber, ethylene propylene rubber (e.g., EPM, a copolymer of ethylene and propylene), ethylene propylene diene rubber (e.g., EPDM, a terpolymer of ethylene, propylene and a diene-component), epichlorohydrin rubber (ECO), polyacrylic rubber (ACM, ABR), silicone rubber (SI, Q, VMQ), fluorosilicone Rubber (FVMQ), fluoroelastomers (e.g., FKM, and FEPM, VITON, TECNOFLON, FLUOREL, AFLAS and DAI-EL), perfluoroelastomers (e.g., FFKM, TECNOFLON PFR, KALREZ, CHEMRAZ, PERLAST), polyether block amides (PEBA), chlorosulfonated polyethylene (CSM, e.g., HYPALON), ethylene-vinyl acetate (EVA), synthetic polyisoprene (IR), butyl rubber (copolymer of isobutylene and isoprene, IIR), halogenated butyl rubbers (chloro butyl rubber: CIIR; bromo butyl rubber: BIIR), polybutadiene (BR), styrene-butadiene rubber (copolymer of polystyrene and polybutadiene, SBR), nitrile rubber (copolymer of polybutadiene and acrylonitrile, NBR; Buna N rubbers), hydrogenated nitrile rubbers (HNBR, THERBAN and ZETPOL), chloroprene rubber (CR, polychloroprene, NEOPRENE, BAYPREN) and the like. An elastomeric material sometimes is incorporated into an adapter in a manufacturing step distinct from a step of incorporating another material (e.g., moldable polymer) in the adapter, in a process sometimes referred to as a "double shot" process.

An adapter or one or more adapter elements (e.g., plate segments, nozzles, tubular projections, connectors) sometimes includes an electrically conductive material, which can be any suitable material that can contain movable electric charges. An electrically conductive material sometimes is, or includes, a conductive metal, non-limiting examples of which include platinum (Pt), palladium (Pd), copper (Cu), nickel (Ni), silver (Ag) and gold (Au). An electrically conductive metal may be in any form for managing static charge, such as metal flakes, metal powder, metal strands or coating of metal, for example. An electrically conductive material sometimes is or includes carbon. An adapter or adapter element sometimes includes about 5% to about 40% or more carbon by weight (e.g., 7-10%, 9-12%, 11-14%, 13-16%, 15-18%, 17-20%, 19-22%, 21-24%, 23-26%, 25-28%, 27-30%, 29-32%, 32-34%, 33-36%, or 35-38% carbon by weight).

An adapter or one or more adapter elements (e.g., plate segments, nozzles, tubular projections, connectors) sometimes includes one or more antimicrobial materials. An antimicrobial material may be coated on a surface and/or impregnated in a material used to manufacture an adapter, in some embodiments. An antimicrobial material sometimes is a metal, non-limiting examples of which include silver, gold, platinum, palladium, copper, iridium, tin, antimony, bismuth, zinc cadmium, chromium, and thallium. An antimicrobial material sometimes is an inorganic particle (e.g., barium sulfate, calcium sulfate, strontium sulfate, titanium oxide, aluminum oxide, silicon oxide, zeolites, mica, talcum, and kaolin), a halogenated hydrocarbon (e.g., halogenated derivatives of salicylanilides, carbanilides, bisphenols, halogenated mono- and poly-alkyl and aralkyl phenols, chlorinated phenols, resorcinol derivatives, diphenyl ethers, anilides of thiophene carboxylic acids, chlorhexidines), quaternary salts (e.g., ammonium compounds), sulfur active compounds or the like.

Use of Pipette Tip Adapters and Adapter Assemblies

In certain embodiments, a cartridge assembly is utilized in a method that includes associating nozzles of a segmented pipette tip adapter in a cartridge assembly with a fluid dispensing device member. Pipette tips of the cartridge assembly often are in air displacement communication with the dispensing device. In certain embodiments, such a method also includes contacting the pipette tips with a fluid, and drawing fluid into the pipette tips by causing the fluid dispensing device to apply negative air displacement pressure to the pipette tips. In some embodiments, such a method includes dispensing (e.g., expelling) fluid from the pipette tips by causing the fluid dispensing device to apply positive air displacement pressure to the pipette tips. In certain embodiments, such a method includes disassociating the segmented pipette tip adapter assembly from the fluid dispensing device.

A segmented pipette tip adapter sometimes is frangible, and sometimes such methods include dissociating plate segments prior to, concurrently or after associating nozzles of the plate segments with a fluid dispensing device member. Dissociating plate segments in a cartridge assembly sometimes includes breaking and/or removing connectors of the segmented pipette tip adapter, and/or breaking and/or removing joints present at junctions, as applicable, prior to associating nozzles of the plate segments with a fluid dispensing device member.

Examples of Non-Limiting Embodiments

Set forth below are certain embodiments that do not limit the technology.

A1. A segmented pipette tip adapter, comprising a plurality of plate segments and one or more junctions between the plate segments, wherein:
- each of the plate segments comprises a proximal surface, a distal surface, edges, one or more nozzles disposed on the proximal surface and one or more tubular projections disposed on the distal surface;
- each of the nozzles comprises a nozzle bore, each of the tubular projections comprises a tubular projection bore, each of the plate segments comprises a plate bore disposed at each of the nozzles, and each nozzle bore is aligned with a tubular projection bore and a plate bore; and
- each of the junctions is between adjacent edges of a pair of adjacent plate segments.

A1.1. The segmented pipette tip adapter of embodiment A1, comprising one or more connectors joining two or more adjacent plate segments.

A1.2. The segmented pipette tip adapter of embodiment A1.1, wherein the plurality of plate segments are connected directly or indirectly by the connectors.

A2. The segmented pipette tip adapter of any one of embodiments A1, A1.1 and A1.2, wherein adjacent edges of adjacent plate segments are joined at each of the junctions.

A3. The segmented pipette tip adapter of embodiment A2, wherein there is no distance, or a maximum distance of 0.005 inches or less, separating the adjacent plate segments at each of the joints.

A4. The segmented pipette tip adapter of any one of embodiments A1, A1.1 and A1.2, wherein adjacent edges of adjacent plate segments are separated by a distance at each of the junctions.

A4.1. The segmented pipette tip adapter of embodiment A4, wherein the distance is uniform or substantially uniform for each of the junctions.

A4.2. The segmented pipette tip adapter of embodiment A4, wherein the distance is not uniform for each of the junctions.

A4.3. The segmented pipette tip adapter of any one of embodiments A1, A1.1, A1.2, A4, A4.1, and A4.2, wherein each of the junctions is a void.

A4.4. The segmented pipette tip adapter of embodiment A4.3, wherein each of the junctions is a slot.

A5. The segmented pipette tip adapter of any one of embodiments A1-A4.4, wherein the one or more connectors permit independent displacement of a first plate segment relative to an adjacent second plate segment connected to the first plate segment.

A6. The segmented pipette tip adapter of any one of embodiments A1.1-A5, wherein one connector, a subset of connectors, or all connectors of the one or more connectors comprise a flexible tether.

A7. The segmented pipette tip adapter of any one of embodiments A1.1-A6, wherein one connector, a subset of connectors, or all connectors of the one or more connectors are disposed in one or more of the junctions.

A8. The segmented pipette tip adapter of any one of embodiments A1.1-A7, wherein one connector, a subset of connectors, or all connectors of the one or more connectors are co-planar with the adapter plate segments.

A9. The segmented pipette tip adapter of any one of embodiments A1.1-A8, wherein one connector, a subset of connectors, or all connectors of the one or more connectors are disposed outside the junctions.

A10. The segmented pipette tip adapter of any one of embodiments A1.1-A9, wherein one connector, a subset of connectors, or all connectors of the one or more connectors are not co-planar with the adapter plate segments.

A11. The segmented pipette tip adapter of any one of embodiments A1.1-A10, wherein each of the plate segments comprises an interior edge, and one connector, a subset of connectors, or all connectors of the one or more connectors are connected to a portion of the interior edge.

A12. The segmented pipette tip adapter of any one of embodiments A1.1-A11, wherein one connector, a subset of connectors, or all connectors of the one or more connectors are connected to a portion of the proximal surface, or the distal surface, or the proximal surface and the distal surface, of two adjacent plate segments.

A13. The segmented pipette tip adapter of any one of embodiments A1.1-A12, wherein one connector connects two or more plate sections.

A14. The segmented pipette tip adapter of any one of embodiments A1.1-A12, wherein one connector connects four plate sections.

A15. The segmented pipette tip adapter of any one of embodiments A1.1-A14, wherein one connector, a subset of connectors, or all connectors of the one or more connectors comprise a center member and a plurality of peripheral members each connected to one of the plate sections.

A16. The segmented pipette tip adapter of any one of embodiments A1.1-A15, wherein one connector, a subset of connectors, or all connectors of the one or more connectors comprise a S-shaped, C-shaped, Y-shaped, X-shaped, U-shaped or V-shaped member.

A17. The segmented pipette tip adapter of any one of embodiments A1.1-A16, wherein each of the plate segments comprises a cutout adjacent to one connector, a subset of connectors, or all connectors of the one or more connectors.

A18. The segmented pipette tip adapter of any one of embodiments A1.1-A17, wherein one connector, a subset of connectors, or all connectors of the one or more connectors are continuously disposed in each of the junctions.

A18.1. The segmented pipette tip adapter of any one of embodiments A1-A18, wherein one junction, a subset of junctions or all junctions comprise perforations.

A19. The segmented pipette tip adapter of any one of embodiment A1-A18, wherein each of the plate segments and the one or more connectors consist of the same material.

A20. The segmented pipette tip adapter of any one of embodiments A1-A18, wherein each of the plate segments consists of a first material and the one or more connectors consist of a second material different than the first material.

A21. The segmented pipette tip adapter of any one of embodiments A1.1-A20, wherein one connector, a subset of connectors, or all connectors of the one or more connectors are of a thickness less than the thickness of each of the plate segments.

A22. The segmented pipette tip adapter of embodiment A21, wherein one connector, a subset of connectors, or all connectors of the one or more connectors are continuously disposed in each of the junctions and define a groove in the junctions.

A23. The segmented pipette tip adapter of any one of embodiments A1.1-A20, wherein one connector, a subset of connectors, or all connectors of the one or more connectors are of a thickness the same as the thickness of each of the plate segments.

A24. The segmented pipette tip adapter of embodiment A23, wherein the one or more connectors are continuously disposed in each of the junctions, each of the plate segments consists of a first material and the one or more connectors consist of a second material different than the first material and having a greater flexibility than the first material.

A25. The segmented pipette tip adapter of any one of embodiments A1-A24, wherein the plate segments are manufactured from a material comprising polypropylene.

A26. The segmented pipette tip adapter of any one of embodiments A1.1-A24, wherein the plate segments; or one connector, a subset of connectors, or all connectors of the one or more connectors; or the plate segments and one connector, a subset of connectors, or all connectors of the one or more connectors; are manufactured from a material comprising polypropylene.

A27. The segmented pipette tip adapter of any one or embodiments A1.1-A24, wherein one connector, a subset of connectors, or all connectors of the one or more connectors are manufactured from a material comprising an elastomer.

A28. The segmented pipette tip adapter of any one of embodiments A1-A27, wherein each of the junctions comprises a linear junction portion.

A29. The segmented pipette tip adapter of any one of embodiments A1-A28, wherein each of the junctions comprises a curved junction portion.

A30. The segmented pipette tip adapter of any one of embodiments A1-A28, wherein each of the junctions is linear.

A31. The segmented pipette tip adapter of any one of embodiments A1-A29, wherein each of the junctions comprises a linear junction portion and a curved junction portion.

A32. The segmented pipette tip adapter of any one of embodiments A1-A31, wherein each of the plate segments comprises:

a plurality of nozzles disposed in an array of nozzles, and a plurality of tubular projections disposed in an array of tubular projections.

A33. The segmented pipette tip adapter of embodiment A32, wherein each of the plate segments comprises the same array of nozzles and the same array of tubular projections.

A34. The segmented pipette tip adapter of any one of embodiments A1-A33, wherein the nozzle bore of each of the nozzles is concentric with the tubular projection bore of the aligned tubular projection.

A35. The segmented pipette tip adapter of any one of embodiments A1-A34, wherein each of the plate bores comprises a conical surface.

A36. The segmented pipette tip adapter of any one of embodiments A1-A34, each of the plate bores comprises a stepped surface or curved surface.

A37. The segmented pipette tip adapter of any one of embodiments A1-A36, wherein each of the nozzles is configured to seal with a fluid dispensing device member.

A38. The segmented pipette tip adapter of embodiment A37, wherein:

each of the nozzles comprises a sidewall exterior surface, and the sidewall exterior surface of each of the nozzles is configured to seal with a fluid dispensing device member.

A39. The segmented pipette tip adapter of embodiment A38, wherein the sidewall exterior surface of each of the nozzles comprises a cylindrical portion and a chamfer portion disposed proximal to the cylindrical portion.

A40. The segmented pipette tip adapter of any one of embodiments A1-A39, wherein each of the tubular projections is configured to seal with a pipette tip.

A41. The segmented pipette tip adapter of embodiment A40, wherein:

each of the tubular projections comprises a sidewall exterior surface, and the sidewall exterior surface of each of the tubular projections is configured to seal with a sidewall interior surface of a pipette tip.

A41.1. The segmented pipette tip adapter of embodiment A41, wherein the sidewall exterior surface of each of the tubular projections is conical.

A42. The segmented pipette tip adapter of embodiment A40, wherein:

each of the tubular projections comprises a sidewall interior surface, and the sidewall interior surface of each of the tubular projections is configured to seal with a sidewall exterior surface of a pipette tip.

A42.1. The segmented pipette tip adapter of embodiment A41 or A42, wherein the sidewall interior surface of each of the tubular projections is cylindrical.

A43. The segmented pipette tip adapter of any one of embodiments A1-A42.1, comprising separable junctions.

A43.1. The segmented pipette tip adapter plate of embodiment A43, wherein the separable junctions comprise perforations.

A44. segmented pipette tip adapter of any one of embodiments A1.1-A43.1, comprising destructible and/or removable connectors.

A45. The segmented pipette tip adapter of any one of embodiments A1-A44, which is unitary.

A46. The segmented pipette tip adapter of any one of embodiments A1-A45, wherein the plate segments are co-planar or substantially co-planar.

B1. An assembly comprising a segmented pipette tip adapter of any one of embodiments A1-A46 and an array of pipette tips, wherein each of the pipette tips is connected to a tubular projection of the adapter.

B2. The assembly of embodiment B1, wherein each of the pipette tips is sealingly engaged with a tubular projection of the adapter.

B3. The assembly of embodiment B1 or B2, wherein:

each of the tubular projections comprises a sidewall exterior surface, and the sidewall exterior surface of each of the tubular projections is in contact with a sidewall interior surface of a pipette tip.

B4. The assembly of embodiment B3, wherein the sidewall exterior surface of each of the tubular projections is conical.

B5. The assembly of any one of embodiments B1-B4, wherein the segmented pipette tip adapter comprises one or more connectors between two or more of the segments.

B6. The assembly of any one of embodiments, B1-B4, wherein the segmented pipette tip adapter comprises no connectors between two or more or all of the segments.

C1. An assembly comprising the assembly of any one of embodiments B1-B6 in connection with a fluid dispensing device.

C2. The assembly of embodiment C1, wherein each of the nozzles is in sealing connection with a fluid dispensing device member.

C3. The assembly of embodiment C1 or C2, wherein:

each of the nozzles comprises a sidewall exterior surface, and the sidewall exterior surface of each of the nozzles is configured to seal with a fluid dispensing device member.

C4. The assembly of embodiment C3, wherein the sidewall exterior surface of each of the nozzles comprises a cylindrical portion and a chamfer portion disposed proximal to the cylindrical portion.

D1. An assembly comprising the assembly of any one of embodiments B1-B6 in connection with a rack.

D2. The assembly of embodiment D1, wherein the rack comprises a proximal surface.

D3. The assembly of embodiment D1 or D2, wherein:

the rack comprises an array of bores disposed at the proximal surface of the rack, and each bore of the array of bores is configured to receive a corresponding pipette tip of the assembly of any one of embodiments B1-B6.

D4. The assembly of embodiment D3, wherein the rack comprises a pipette tip receptacle plate, the array of bores is disposed in the pipette tip receptacle plate, and the proximal surface of the pipette tip receptacle plate is the proximal surface of the rack.

D5. The assembly of embodiment D2, D3 or D4, wherein:

each pipette tip comprises a shoulder disposed between the proximal region and distal region of the pipette tip, and the shoulder is in contact with the proximal surface of the rack.

D6. The assembly of embodiment D5, wherein each pipette tip comprises a plurality of ribs.

D7. The assembly of embodiment D6, wherein:

each of the ribs comprises a distal surface; and the distal surface of each rib of the plurality of ribs forms the shoulder.

D8. The assembly of embodiment D5 or D6, wherein:

each of the pipette tips comprises an exterior surface; and the shoulder is a continuous surface surrounding the exterior surface of the pipette tip.

E1. A mold configured to manufacture a segmented pipette tip adapter of any one of embodiments A1-A46.

E2. A method for manufacturing a segmented pipette tip adapter of any one of embodiments A1-A46, comprising:

contacting a mold of embodiment E1 with a moldable polymer, and ejecting the segmented pipette tip adapter from the mold after the polymer cures for a period of time.

E3. A method for manufacturing a segmented pipette tip adapter of any one of embodiments A1-A46, comprising:

providing a segmented pipette tip adapter of any one of embodiments A1-A46; and breaking one or more or all junctions and/or connectors, or removing one or more or all junctions and/or connectors.

E4. A method for manufacturing an assembly of any one of embodiments B1-B6, comprising joining pipette tips in an array of pipette tips to tubular projections of a segmented pipette tip adapter of any one of embodiments A1-A46.

E5. The method of embodiment E4, wherein the segmented pipette tip adapter comprises no connectors and/or junctions between two or more or all of the segments, and the method comprises removing and/or breaking one or more or all of the connectors and/or junctions prior to, concurrently with, or after the pipette tips in the array of pipette tips are joined to the tubular projections of the adapter.

E6. A method for manufacturing an assembly of any one of embodiments C1-04, comprising joining nozzles of a segmented pipette tip adapter in an assembly of any one or embodiments B1-B6 to a fluid dispensing device member.

E7. A method for manufacturing an assembly of any one of embodiments D1-D8, comprising joining an assembly of any one of embodiments B1-B6 to a pipette tip rack.

E8. The method of embodiment E7, wherein the segmented pipette tip adapter comprises no connectors and/or junctions between two or more or all of the segments, and the method comprises removing and/or breaking one or more or all of the connectors and/or junctions prior to, concurrently with, or after the assembly of any one of embodiments B1-B6 is joined to the rack.

F1. A method of using an assembly of any one of embodiments B1-B6, comprising:

associating nozzles of a segmented pipette tip adapter in an assembly of any one or embodiments B1-B6 with a fluid dispensing device member, wherein the pipette tips of the assembly are in air displacement communication with the dispensing device; and drawing fluid into the pipette tips by causing the fluid dispensing device to apply negative air displacement pressure to the pipette tips, or expelling fluid from the pipette tips by causing the fluid dispensing device to apply positive air displacement pressure to the pipette tips.

F2. The method of embodiment F1, wherein the assembly of any one of embodiments B1-B6 is provided in an assembly of any one of embodiments D1-D8.

F3. The method of embodiment F2, comprising disassociating the assembly of any one of embodiments B1-B6 from the rack in the assembly of any one of embodiments D1-D8.

F4. The method of any one of embodiments F1-F3, comprising:

contacting the pipette tips with a fluid, and drawing fluid into the pipette tips by causing the fluid dispensing device to apply negative air displacement pressure to the pipette tips.

F5. The method of any one of embodiments F1-F4, comprising expelling fluid from the pipette tips by causing the fluid dispensing device to apply positive air displacement pressure to the pipette tips.

F6. The method of any one of embodiments F1-F5, comprising disassociating the segmented pipette tip adapter assembly from the fluid dispensing device.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms “comprising,” “consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. A segmented pipette tip adapter, comprising a plurality of plate segments, one or more junctions between the plate segments and a connector, wherein:
- each of the junctions is a void;
- each of the plate segments comprises a proximal surface, a distal surface, interior edges between adjacent plate segments, one or more nozzles disposed on the proximal surface and one or more tubular projections disposed on the distal surface;
- each of the nozzles comprises a nozzle bore, each of the tubular projections comprises a tubular projection bore, each of the plate segments comprises a plate bore disposed at each of the nozzles, and each nozzle bore is aligned with a tubular projection bore and a plate bore;
- each of the junctions is between adjacent edges of a pair of adjacent plate segments;
- the connector joins four plate segments; and
- the connector is connected to a portion of one of the interior edges of each of the four plate segments.

2. The segmented pipette tip adapter of claim 1, wherein:
- adjacent edges of adjacent plate segments are separated by a distance at each of the junctions; and
- the distance is uniform or substantially uniform for each of the junctions.

3. The segmented pipette tip adapter of claim 1, wherein each of the junctions is a slot.

4. The segmented pipette tip adapter of claim 1, wherein the connector is configured for independent displacement of a first plate segment relative to an adjacent second plate segment connected to the first plate segment.

5. The segmented pipette tip adapter of claim 1, wherein the connector comprises a flexible tether.

6. The segmented pipette tip adapter of claim 1, wherein the connector comprises a center member and a plurality of peripheral members each connected to one of the plate segments.

7. The segmented pipette tip adapter of claim 1, wherein each of the plate segments and the connector consist of the same material.

8. The segmented pipette tip adapter of claim 1, wherein each of the plate segments comprises:
- a plurality of nozzles disposed in an array of nozzles, and
- a plurality of tubular projections disposed in an array of tubular projections.

9. The segmented pipette tip adapter of claim 8, wherein each of the plate segments comprises the same array of nozzles and the same array of tubular projections.

10. The segmented pipette tip adapter of claim 1, wherein the nozzle bore of each of the nozzles is concentric with the tubular projection bore of the aligned tubular projection.

11. The segmented pipette tip adapter of claim 1, wherein each of the nozzles is configured to seal with a fluid dispensing device member.

12. The segmented pipette tip adapter of claim 1, wherein each of the tubular projections is configured to seal with a pipette tip.

13. The segmented pipette tip adapter of claim 1, wherein the plate segments are co-planar or substantially co-planar.

14. An assembly, comprising a segmented pipette tip adapter of claim 1 and an array of pipette tips, wherein each of the pipette tips is in sealing connection with a tubular projection of the adapter.

15. An assembly, comprising the assembly of claim 14 in connection with a fluid dispensing device, wherein each of the nozzles of the segmented pipette tip adapter is in sealing connection with a fluid dispensing device member.

16. A method, comprising:
- associating nozzles of a segmented pipette tip adapter in an assembly of claim 14 with a fluid dispensing device member, wherein the pipette tips of the assembly are in air displacement communication with the dispensing device member; and
- drawing fluid into the pipette tips by causing the fluid dispensing device member to apply negative air displacement pressure to the pipette tips, or expelling fluid from the pipette tips by causing the fluid dispensing device member to apply positive air displacement pressure to the pipette tips.

* * * * *